(12) United States Patent
Pessoa et al.

(10) Patent No.: US 7,529,363 B2
(45) Date of Patent: May 5, 2009

(54) TONE DETECTOR AND METHOD THEREFOR

(75) Inventors: Lucio F. C. Pessoa, Cedar Park, TX (US); Valentin Emiya, Vincennes (FR); David Melles, Montaigut sur Save (FR); Delphine Vallot, Toulouse (FR)

(73) Assignee: Freescale Semiconductor, Inc., Austin, TX (US)

( * ) Notice: Subject to any disclaimer, the term of this patent is extended or adjusted under 35 U.S.C. 154(b) by 1169 days.

(21) Appl. No.: 10/292,779

(22) Filed: Nov. 12, 2002

(65) Prior Publication Data

US 2004/0047370 A1 Mar. 11, 2004

(51) Int. Cl.
*H04M 3/00* (2006.01)

(52) U.S. Cl. .............. 379/386; 379/142.18; 379/93.26

(58) Field of Classification Search ............ 379/100.14, 379/283, 286, 355.01, 386
See application file for complete search history.

(56) References Cited

U.S. PATENT DOCUMENTS

| | | | |
|---|---|---|---|
| 4,363,100 A | 12/1982 | Agnew et al. | |
| 4,521,647 A * | 6/1985 | Olson et al. | 379/351 |
| 4,658,420 A | 4/1987 | Fukushi et al. | |
| 4,829,566 A | 5/1989 | Lassaux et al. | |
| 5,274,579 A * | 12/1993 | Nelson et al. | 708/312 |
| 5,353,346 A | 10/1994 | Cox et al. | |
| 5,392,347 A | 2/1995 | Ito et al. | |
| 5,420,921 A | 5/1995 | Lahdemaki | |
| 5,442,130 A * | 8/1995 | Kitayama et al. | 84/661 |
| 5,615,302 A | 3/1997 | McEachern | |
| 5,689,556 A | 11/1997 | Gupta et al. | |
| 5,815,568 A | 9/1998 | Trump | |

(Continued)

FOREIGN PATENT DOCUMENTS

EP 0 548 438 A1 6/1993

(Continued)

OTHER PUBLICATIONS

Newton's Telecom Dictionary (p. 244, Copyright 1998 Harry Newton).*

(Continued)

*Primary Examiner*—Curtis Kuntz
*Assistant Examiner*—Karen L Le
(74) *Attorney, Agent, or Firm*—Joanna G. Chiu; Susan C. Hill

(57) ABSTRACT

A tone detector able to detect multicomponent tones for various tone formats is disclosed. An input signal is received and frequency and amplitude components, if any, of each sample of the incoming signal are estimated. In estimating the components, a current digit value is used to appropriately filter the input signal and estimate frequency and amplitude components. Using the component estimates, a new digit value is determined using a table in storage corresponding to the current tone format. The new digit value corresponds to the symbol whose components are closest in value to the estimated components corresponding to the current digit value. The new digit value is fed back as the current digit value and used in combination with a next sample of the input signal to determine a new digit value. A decision unit is used to process the digit values to determine when a valid symbol is detected.

18 Claims, 9 Drawing Sheets

U.S. PATENT DOCUMENTS

| | | | |
|---|---|---|---|
| 5,818,929 | A | 10/1998 | Yaguchi |
| 5,877,653 | A | 3/1999 | Kim et al. |
| 5,920,834 | A | 7/1999 | Sih et al. |
| 6,006,083 | A | 12/1999 | Tong et al. |
| 6,021,192 | A | 2/2000 | Jones |
| 6,055,310 | A | 4/2000 | Zhang et al. |
| 6,321,200 | B1 | 11/2001 | Casey |
| 6,415,139 | B1 | 7/2002 | Shimbo |
| 6,480,589 | B1 * | 11/2002 | Lee et al. ............... 379/142.04 |
| 6,748,059 | B2 * | 6/2004 | Das et al. ............... 379/100.14 |
| 6,782,095 | B1 * | 8/2004 | Leong et al. ................ 379/386 |
| 6,914,979 | B2 | 7/2005 | Kurtz et al. |
| 2002/0018555 | A1 | 2/2002 | Charbin-Pramayon |
| 2002/0154760 | A1 | 10/2002 | Branden |

FOREIGN PATENT DOCUMENTS

| | | |
|---|---|---|
| EP | 0300265 | 10/1995 |
| WO | WO 00/30325 | 5/2000 |

OTHER PUBLICATIONS

EP 02 29 2110 European Search Report mailed Jan. 20, 2003.

Deosthali, Amey A. et al., "A Low-Complexity ITU-Compliant Dual Tone Multiple Frequency Detector," *IEEE Transactions on Signal Processing*, Mar. 2000, pp. 911-917, vol. 48, No. 3.

Felder, Matthew D. et al., "Efficient Dual-Tone Multifrequency Detection Using the Nonuniform Discrete Fourier Transform," *IEEE Signal Processing Letters*, Jul. 1998, pp. 160-163, vol. 5, No. 7.

Kaiser, James F., "On a Simple Algorithm to Calculate the 'Energy' of a Signal," *Proc. IEEE*, 1990, pp. 381-384, S7.3.

Kumaresan, R. et al., "Instantaneous Non-Linear Operators for Tracking Multicomponent Signal Parameters," *Proc. IEEE*, 1992, pp. 404-407.

Maragos, Petros et al., "Energy Separation in Signal Modulations with Application to Speech Analysis," *IEEE Transactions on Signal Processing*, Oct. 1993, pp. 3024-3051, vol. 41, No. 10.

Santhanam, Balasubramaniam et al., "Multicomponent AM-FM Demodulation via Periodicity-Based Algebraic Separation and Energy-Based Demodulation," *IEEE Transactions on Communications*, Mar. 2000, pp. 473-489, vol. 48, No. 3.

Sicuranza, Giovanni L., "Polynomial Filters for Image and Video Processing," *First International Workshop on Image and Signal Processing Analysis*, Jun. 14-15, 2000, pp. 15-26, Pula, Croatia.

Velez, Edgar F., "Detection of Multi-tone Signals Based on Energy Operators," *Proc. IEEE*, Aug. 1994, pp. 229-232.

Daly, D. et al.; "A Minimum Mean-Squared Error Interpretation of Residual ISI Channel Shortening for Discrete Multitone Trnasceivers"; 2001; pp. 2065-2068; IEEE.

Chiu et al.; "Time-Domain Channel Equalizer Design Using the Inverse Power Method"; 1999; pp. 973-977; IEEE.

Melsa, Peter et al.; "Impulse Response Shortening for Discrete Multitone Transeivers"; IEEE Transactions on Communications; Dec., 1996; pp. 1662-1672; vol. 44, No. 12, IEEE.

Liu, Wei et al.; "A Generalization to the Teager-Kaiser Energy Function & Application to Resolving Two Closely-Spaced Tones"; 1995; pp. 1637-1640; IEEE.

\* cited by examiner

TONE DETECTOR AND METHOD THEREFOR

RELATED APPLICATIONS

This is related to U.S. patent application Ser. No. 10/178, 427, filed on Jun. 24, 2002, and entitled "Monitoring and control of an Adaptive Filter in a Communication System," U.S. patent application Ser. No. 10/178,154, filed on Jun. 24, 2002, and entitled "Method and Apparatus for Pure Delay Estimation in a Communication System," U.S. patent application Ser. No. 10/178,560, filed on Jun. 24, 2002, and entitled "Method and Apparatus for Tone Indication," U.S. patent application Ser. No. 10/178,176, filed on Jun. 24, 2002, and entitled "Method and Apparatus for Performing Adaptive Filtering," and U.S. patent application Ser. No. 10/178,597, filed on Jun. 24, 2002, and entitled "Method and Apparatus for Non-Linear Processing of an Audio Signal," all of which are assigned to the current assignee hereof.

1. Field of the Invention

The present invention relates generally to tone detection, and more specifically, to multicomponent tone detection.

2. Related Art

In many systems, such as, for example, telecommunication networks, there is a need for detecting signaling tones that are composed by multiple sinusoidal components. For example, Dual Tone Multiple Frequency (DTMF), having two-tone components, is a set of standard signaling tones adopted by telephone companies, which are generated when a key is pressed on telephone equipment. A pressed key generates a dual-frequency tone composed of a low frequency component and a high frequency component. Other examples of tone formats having signaling tones which are composed by multiple sinusoidal components include Multiple Frequency (MF-R1, MF-R2), tones with AM modulation (e.g. 3 tone components), and off-hook warning tones (e.g. four components).

One solution attempts to perform multicomponent tone detection based on standard Fourier transform methods. However, some of these methods are generally not applicable to more than two components or cannot handle other important two-component cases outside of DTMF. Also, these Fourier transform methods require buffering of previous samples, thus increasing the complexity and time of tone detection. Furthermore, the solutions available today that attempt to detect multicomponent tones are complex and not general enough to apply to various different tone formats having different numbers of tone components. Therefore, a need exists for an improved multiple component tone detector that is capable of detecting multicomponent tones of various different tone formats.

BRIEF DESCRIPTION OF THE DRAWINGS

The present invention is illustrated by way of example and not limited by the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time-multiplexed manner. Likewise, single conductors carrying multiple signals may be separated out into various different conductors carrying subsets of these signals. Therefore, many options exist for transferring signals.

The terms "assert" and "negate" (or "deassert") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Connectivity

Figure 1:
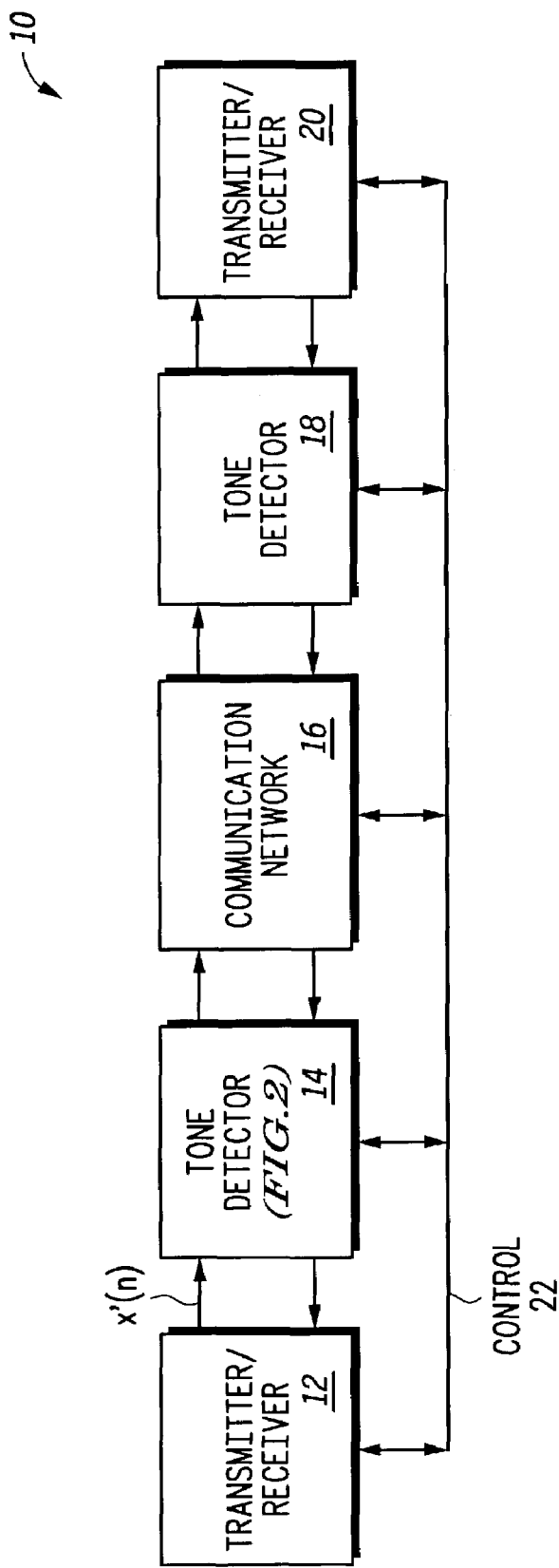
FIG. 1 illustrates, in block diagram form, a communication system in accordance with one embodiment of the present invention.

FIG. 1 illustrates, in block diagram form, a communication system 10 in accordance with one embodiment of the present invention. Communication system 10 includes a transmitter/receiver 12, a tone detector 14, a communication network 16, a tone detector 18, a transmitter/receiver 20, and a control bus 22. Control bus 22 is bidirectionally coupled to transmitter/receiver 12, tone detector 14, communication network 16, tone detector 18, and transmitter/receiver 20. Transmitter/receiver 12 is bidirectionally coupled to tone detector 14, which is bidirectionally coupled to communication network 16, which is bidirectionally coupled to tone detector 18, which is bidirectionally coupled to transmitter/receiver 20.

Figure 2:
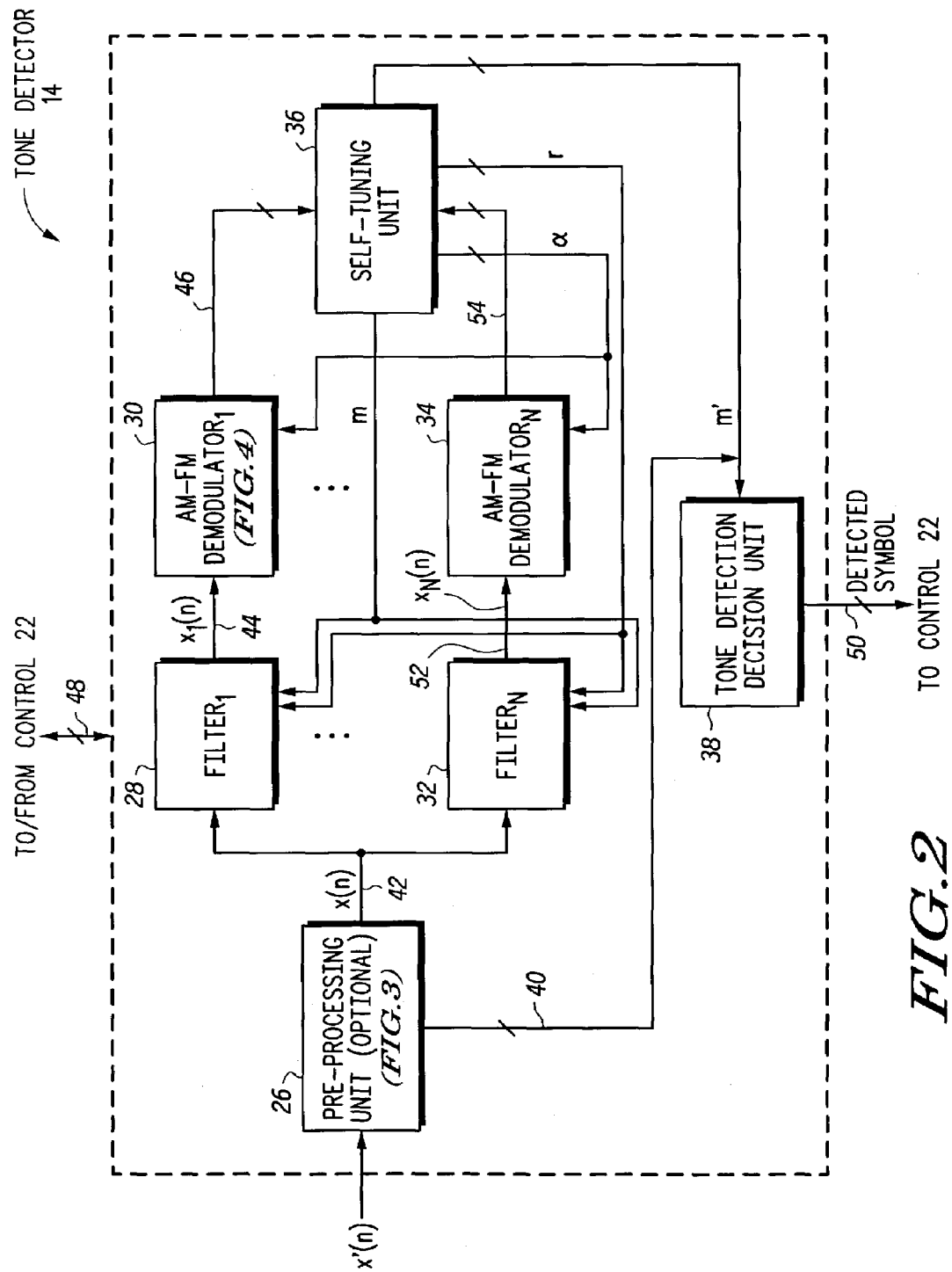
FIG. 2 illustrates, in block diagram form, a tone detector of the communication system of FIG. 1, in accordance with one embodiment of the present invention.

FIG. 2 illustrates, in block diagram form, tone detector 14 in accordance with one embodiment of the present invention. Tone detector 14 includes an optional pre-processing unit 26, filter$_1$ 28, filter$_N$ 32, AM-FM demodulator$_1$ 30, AM-FM demodulator$_N$ 34, self-tuning unit 36, and tone detection decision unit 38. Note that tone detector 14 includes N filters and N AM-FM demodulators, as needed. Pre-processing unit 26 (if present) is coupled to each of filter$_1$ 28 through filter$_N$ 32 via conductor 42 and is coupled to tone detection decision unit 38 via conductor 40. Filter$_1$ 28 is coupled to AM-FM demodulator$_1$ 30 via conductor 44, and AM-FM demodulator$_1$ 30 is coupled to self-tuning unit 36 via conductors 46. Filter$_N$ 32 is coupled to AM-FM demodulator$_N$ 34 via conductor 52, and AM-FM demodulator$_N$ 34 is coupled to self-tuning unit 36 via conductors 54. Filter$_1$ 28 through filter$_N$ 32 each receive r and m from self-tuning unit 36, and AM-FM demodulator$_1$ 30 through AM-FM demodulator$_N$ 34 each receive α from self-tuning unit 36. Tone detection decision unit 38 is coupled to receive m' from self-tuning unit 36 and is coupled to provide a detected symbol to control bus 22 via conductors 50. Tone detector 14 is also coupled to provide and receive information from control bus 22 via conductors 48.

Figure 3:
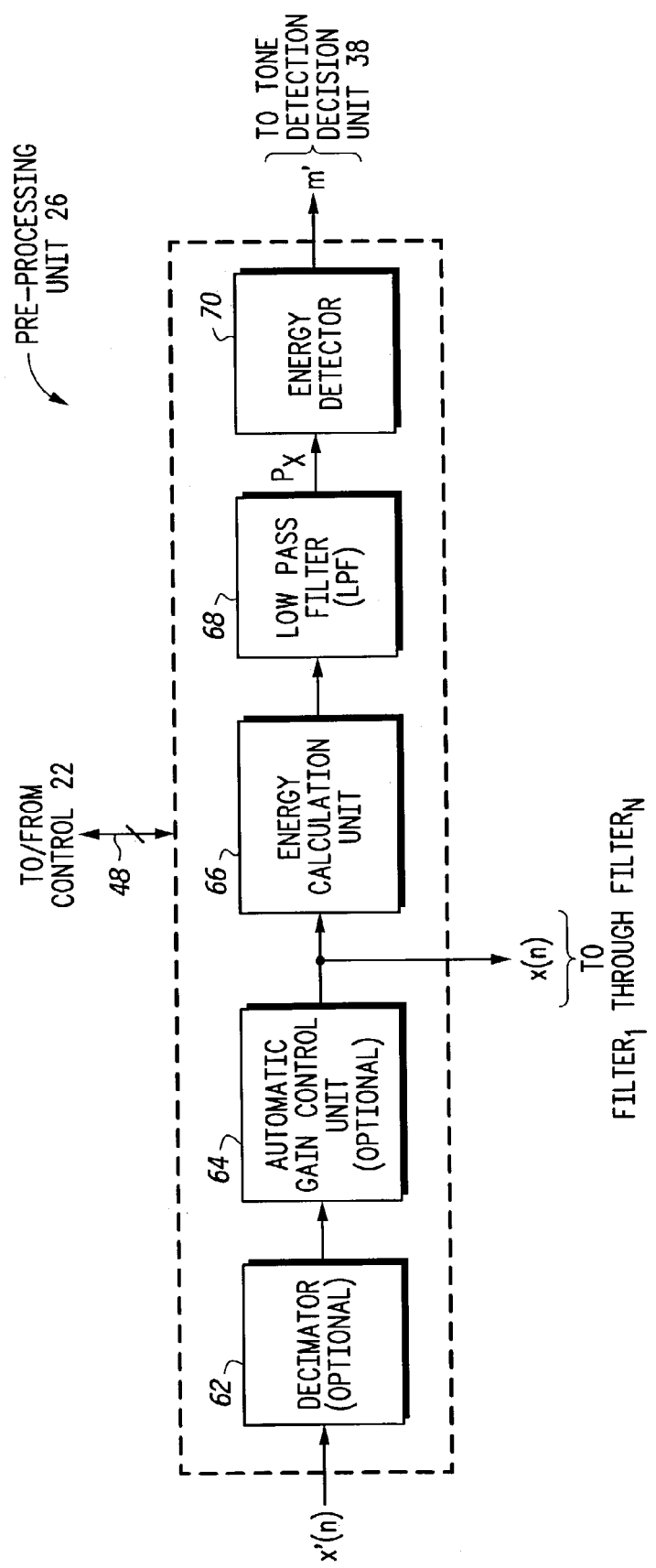
FIG. 3 illustrates, in block diagram form, a pre-processing unit of the tone detector of FIG. 2, in accordance with one embodiment of the present invention.

FIG. 3 illustrates, in block diagram form, pre-processing unit 26 in accordance with one embodiment of the present invention. Pre-processing unit 26 is optional and includes an optional decimator 62, an optional automatic gain control (AGC) unit 64, an energy calculation unit 66, a low pass filter (LPF) 68, and an energy detector 70. Decimator 62 is coupled to AGC 64. AGC 64 is coupled to energy calculation unit 66 as provides x(n) to filter$_1$ 28 through filter$_N$ 32. Note that each of decimator 62 and AGC 64 is optional, and if neither is present, x'(n) is provided directly as x(n) to filter$_1$ 28 through filter$_N$ 32, and energy calculation unit 66 receives x'(n) as x(n). Energy calculation unit 66 is coupled to LPF 68, which is coupled to provide $P_x$ to energy detector 70. Energy detector 70 provides m' to tone detection decision unit 38.

Figure 4:
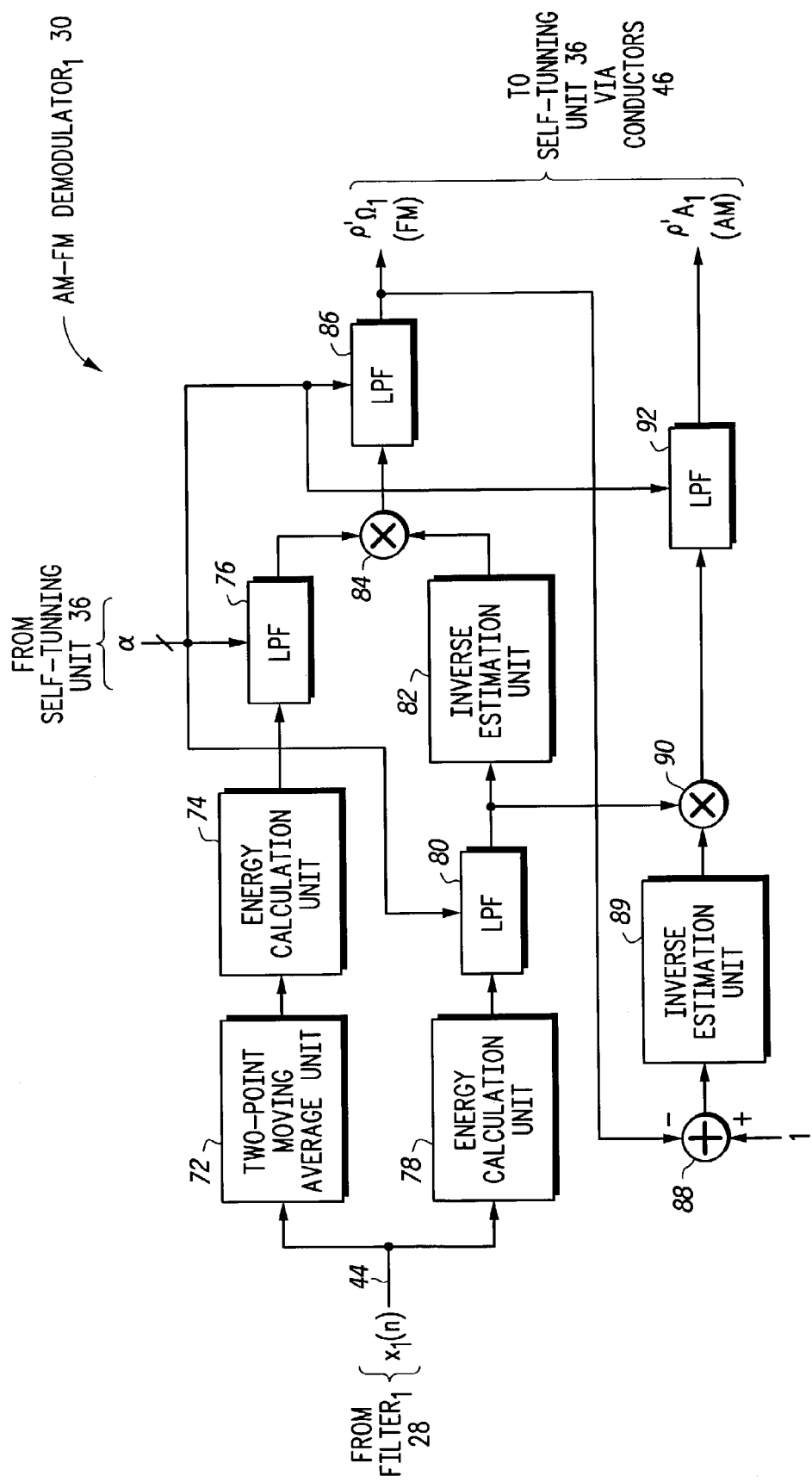
FIG. 4 illustrates, in block diagram form, an AM-FM demodulator of the tone detector of FIG. 2, in accordance with one embodiment of the present invention.

FIG. 4 illustrates, in block diagram form, AM-FM demodulator$_1$ 30 of FIG. 2 in accordance with one embodiment of the present invention. Note that FIG. 4 illustrates AM-FM demodulator$_1$ 30 as an example; however, the block diagram of FIG. 4 can apply to any of AM-FM demodulator$_1$ 30 through AM-FM demodulator$_N$ 34. That is, the same block diagram and functionality applies to all of the demodulators. AM-FM demodulator$_1$ 30 receives $x_1(n)$, corresponding to a first tone component of x(n), via conductor 44 from filter$_1$ 28. AM-FM demodulator$_1$ 30 includes a two-point moving average unit 72, an energy calculation unit 74, an LPF 76, a multiplier 84, an LPF 86, an energy calculation unit 78, an LPF 80, an inverse estimation unit 82, an adder 88, an inverse estimation unit 89, a multiplier 90, and an LPF 92. Two-point moving average unit 72 and energy calculation unit 78 each receive $x_1(n)$ via conductor 44. Two-point moving average unit 72 is coupled to energy calculation unit 74, which is coupled to LPF 76, which is coupled to multiplier 84. Energy calculation unit 78 is coupled to LPF 80, which is coupled to multiplier 90 and inverse estimation unit 82. Inverse estimation unit 82 is coupled to multiplier 84, which is coupled to LPF 86. LPF 86 is coupled to provide $\rho'_{\Omega_1}$ (corresponding to a function of the frequency of the first tone component of x(n)) to self-tuning unit 36 via conductors 46 and is coupled to adder 88. Adder 88 receives a 1 (which may be hardwired or stored in a storage unit) and is coupled to inverse estimation unit 89, which is coupled to multiplier 90. Multiplier 90 is coupled to LPF 92, which provides $\rho'_{A_1}$ (corresponding to a function of the amplitude of the first tone component of x(n)) to self-tuning unit 36 via conductors 46. LPFs 80, 76, 86, and 92 each are coupled to receive α from self-tuning unit 36.

Figure 5:
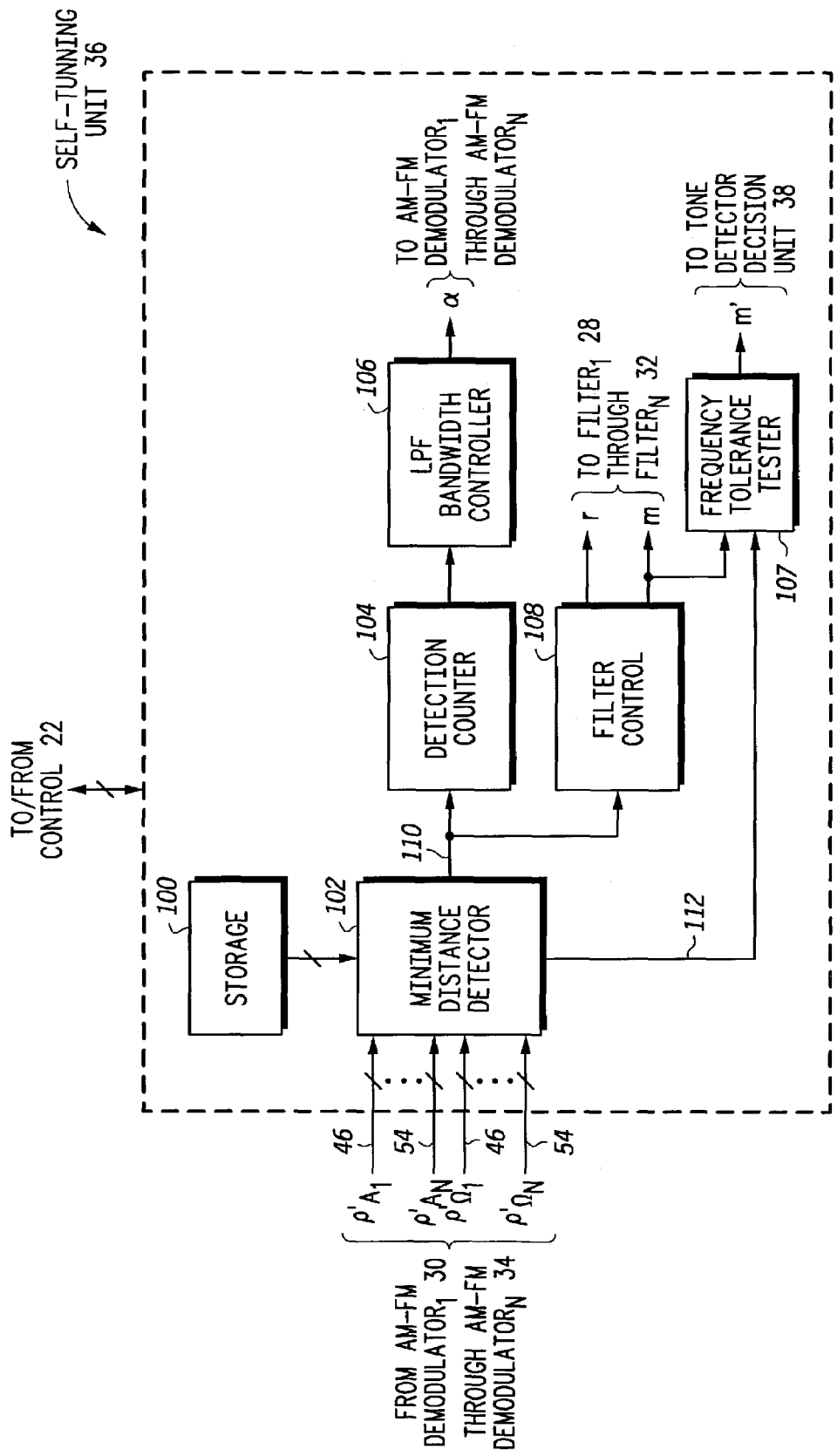
FIG. 5 illustrates, in block diagram form, a self-tuning unit of the tone detector of FIG. 2, in accordance with one embodiment of the present invention.

FIG. 5 illustrates, in block diagram form, self-tuning unit 36 of FIG. 2 in accordance with one embodiment of the present invention. Self-tuning unit 36 includes storage 100, a minimum distance detector 102, a detection counter 104, an LPF bandwidth controller 106, and a filter control 108. Minimum distance detector is coupled to receive $\rho'_{A_1}$ through $\rho'_{A_N}$ via conductors 46 and 54, corresponding to functions of the amplitude of tone components 1 through N of x(n) and is coupled to receive $\rho'_{\Omega_1}$ through $\rho'_{\Omega_N}$, via conductors 46 and 54, corresponding to functions of the frequency of tone components 1 through N of x(n). Minimum distance detector 102 is coupled to storage 100, detection counter 104, filter control 108, and frequency tolerance tester 107. Filter control 108 is coupled to provide m to frequency tolerance tester 107 and to filter$_1$ 28 through filter$_N$ 32, and r to filter$_1$ 28 through filter$_N$ 32. Frequency tolerance tester 107 is coupled to filter control 108 to receive m, to minimum distance detector 102 to receive a frequency tolerance flag via conductors 112, and provides m' to tone detector decision unit 38. LPF bandwidth controller 106 is coupled to provide α to AM-FM demodulator$_1$ 30 through AM-FM demodulator$_N$ 34.

Note that FIGS. 1-5 illustrate one embodiment of blocks found within communication system 10 and tone detector 14. Alternate embodiments may include various different elements than those illustrated, more elements than those illustrated, or less elements than those illustrated, depending on the functionality desired. Furthermore, the blocks within FIGS. 1-5 can be grouped differently or connected differently and still achieve similar results.

Therefore, FIGS. 1-5 are only meant to provide examples used to illustrate the concepts that will be discussed below. Also, although the connections in FIGS. 1-5 may have been drawing as a single conductor (unidirectional or bidirectional) or as multiple conductors (unidirectional or bidirectional), a variety of different connections may be used. For example, a multiple conductor can be replaced with a variety of different single unidirectional or bidirectional conductors. Similarly, single conductors can be expanded into multiple unidirectional or bidirectional conductors. Signals can be communicated serially via a single conductor or can be communicated in parallel via multiple conductors. Also, signals can be time multiplexed via single or multiple conductors. Therefore, the connections illustrated in FIGS. 1-5 can be implemented in a variety of different ways while still achieving the desired functionality. Also, as will be described further below, the designs of FIGS. 1-5 can be implemented in hardware, software, or a combination of hardware and software.

Operation

Referring back to FIG. 1, transmitter/receiver 12 provides and receives data signals via tone detector 14 to communication network 16. Similarly, transmitter/receiver 20 provides and receives data signals via tone detector 18 to communication network 16. Therefore, transmitter/receiver 12 and 20 are able to communication with each other through communication network 16. Transmitter/receiver 12 and transmitter/receiver 20 can each be any device used for communicating over communication network 16, such as, for example, a telephone, a modem, etc. Also, communication network 16 may include a packet telephony network (including, for example, voice over internet protocol (IP), data over packet, asynchronous transfer mode (ATM), etc., and could either apply to wireless or wireline systems) or Public Switching Telephone Network (PSTN). In alternate embodiments, communication system 10 may refer to any type of communication system.

Control bus 22 provides a control pathway among transmitter/receiver 12 and 20, tone detectors 14 and 18, and communication network 16. Control signals transmitted via control bus 22 are generally not in-line signals. For example, control bus 22 may include an enabling/disabling signal to enable or disable tone detector 14 or 18, or may include signals that need to be communicated among various portions of tone detector 14 or 18. Control 22 may also include a signal to indicate whether the telephone is on or off the hook.

Note that operation of transmitter/receiver 12 and tone detector 14 is analogous to the operation of transmitter/receiver 20 and tone detector 18. That is, communication system 10, as illustrated in FIG. 1, is symmetrical. Therefore, the descriptions of FIGS. 2-9 will be made in reference to transmitter/receiver 12 and tone detector 14; however, it should be understood that the descriptions also apply to transmitter/receiver 20 and tone detector 18. In FIG. 1, transmitter/receiver 12 provides a send signal, labeled x'(n) to tone detector 14. Signal x'(n) can include normal speech or can include a tone of a particular tone format, such as DTMF, MF-R1, MF-R2, etc. For example, when dialing a phone number within the United States, transmitter/receiver 12 provides to tone detector 14 a tone in DTMF format each time a key is pressed on the telephone. As described above, each tone in DTMF format is a dual-frequency tone, and tone detector 14 identifies the low and high frequency components of the received tone and then identifies which key was pressed (assuming the received tone corresponds to a valid key). Alternatively, tone detector 14 may be used to detect and identify multicomponent tones (i.e. tones which have multiple frequency components) having any tone format, and is not limited to DTMF format.

Figure 6:
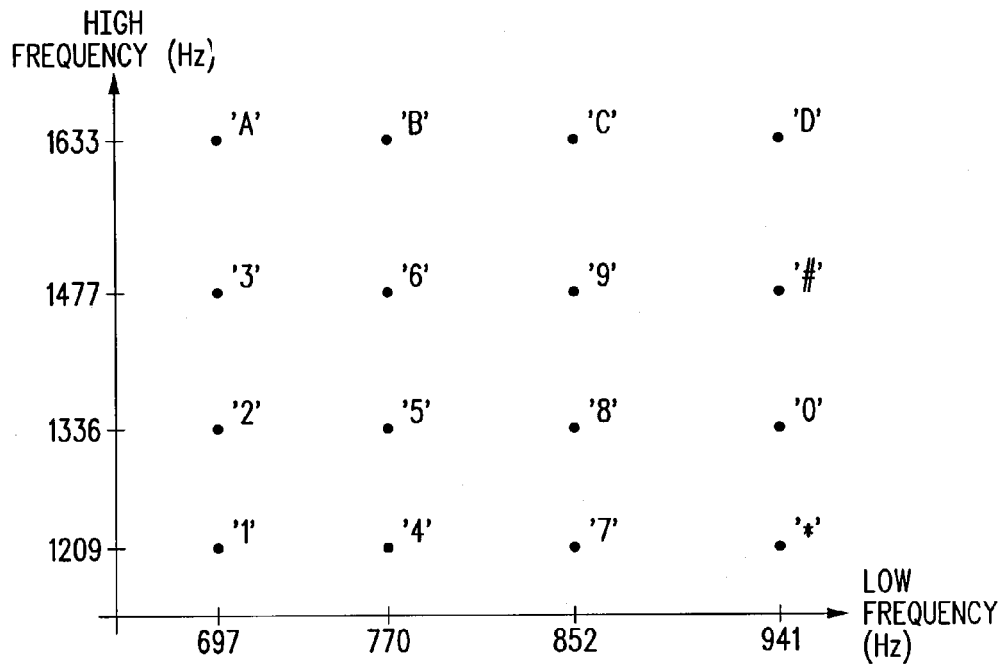
FIG. 6 illustrates DTMF digits represented in graph form.

As seen in FIG. 6, an example of DTMF dial tones is provided on a two dimensional grid with the low frequency values (697 Hz through 941 Hz) provided on the horizontal axis and the high frequency values (1209 Hz through 1633 Hz) provided on the vertical axis. Each of the 16 valid DTMF symbols (0-9, A-D, #, and *) are plotted on the graph at a point corresponding to their two frequency components. For example, DTMF symbol '3' corresponds to a tone composed of a first (low) frequency component having a frequency of 697 Hz and a second (high) frequency component having a frequency of 1477 Hz. Therefore, each of the 16 DTMF symbols corresponds to a tone composed of two sinusoidal waveforms having two different frequencies, one selected from 697 Hz, 770 Hz, 852 Hz, and 941 Hz, and the other selected from 1209 Hz, 1336 Hz, 1477 Hz, and 1633 Hz. Therefore, 8 different frequencies are used in DTMF to provide 16 different signaling tones. (Note that the DTMF symbols are represented by two frequency components, regardless of amplitude. However, in alternate tone formats, signaling tones may include multiple frequency components where amplitudes are also taken into account, as will be discussed further below.) Tone detector 14 can therefore be used to detect when valid tones are received and identify which symbols are indicated by the tones. For example, if tone detector 14 detects a first frequency component at 852 Hz and a second frequency component at 1477 Hz, then a DTMF symbol of '9' is indicated (assuming the tones are detected for a particular duration of time following a valid pause, as defined by the DTMF tone format).

Figure 7:
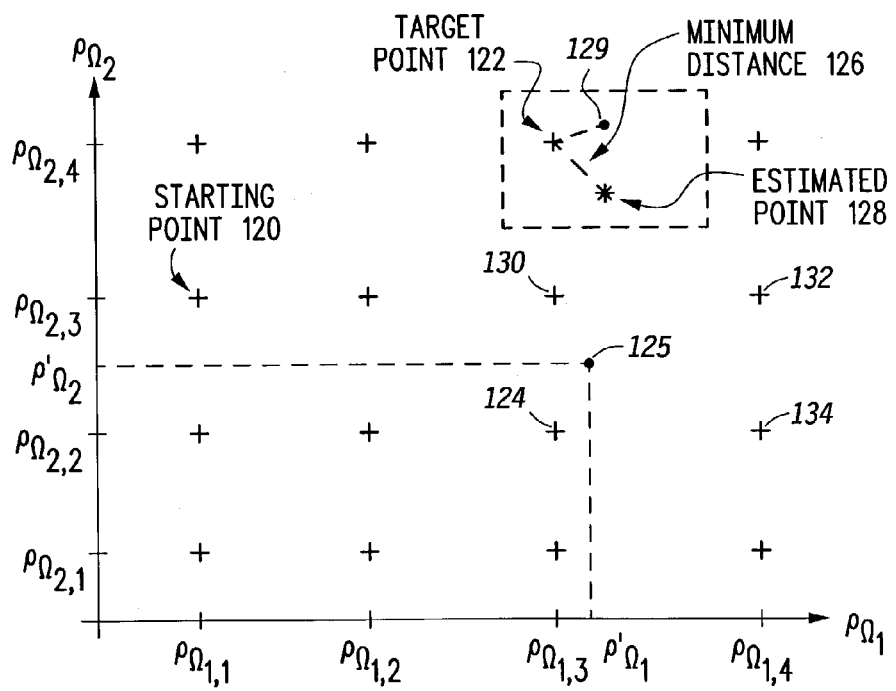
FIG. 7 illustrates, in graph form, a general example of a representation of multicomponent digits.

FIG. 7 illustrates an example of a generic tone format, where each of the valid symbols (each having two frequency components corresponding to $\rho_{\Omega_1}$ and $\rho_{\Omega_2}$) are plotted on a two-dimensional grid. The grid of FIG. 7, rather than using actual frequency values for the horizontal and vertical axes, uses a function of the frequencies for each axis. That is, $\rho_{\Omega_1}$ represents a function of the frequency $\Omega_1$ along the horizontal axis and $\rho_{\Omega_2}$ represents a function of the frequency $\Omega_2$ along the vertical axis. For example, in one embodiment that will be described in more detail below, $\rho_{\Omega_1} = \cos^2(b\Omega_1)$ and $\rho_{\Omega_2} = \cos^2(b\Omega_2)$, where b is a constant. (Note that $\rho_{\Omega_1}$ and $\rho_{\Omega_2}$ may correspond to overlapping frequency ranges, or may correspond to nonoverlapping frequency ranges.) Therefore, each valid symbol, such as, for example, the symbol corresponding to point 124, is composed of two frequency components: $\rho_{\Omega_{1,3}}$ and $\rho_{\Omega_{2,2}}$ corresponding to particular values of $\rho_{\Omega_1}$ and $\rho_{\Omega_2}$, respectively. (Note that in some embodiments, the frequency components correspond to particular values of $\rho_{\Omega_1}$ and $\rho_{\Omega_2}$ within predetermined tolerances, such as, for example, +/−1.5% of the nominal frequency f, which in turn defines an asymmetric tolerance range around the nominal value of $\rho_\Omega$. In this example, the symbol corresponding to point 124 would be detected if a frequency component corresponding to $\rho_{\Omega_{1,3}}$ +/−1.5% of $f_{1,3}$ and another frequency component corresponding to $\rho_{\Omega_{2,2}}$ +/1.5% of $f_{2,2}$ were both detected.)

Each of the 16 symbols plotted on the grid of FIG. 7 (indicated by the "+"s) therefore corresponds to two frequency components: one indicated by a unique value of $\rho_{\Omega_1}$ (e.g. $\rho_{\Omega_{1,1}}$, $\rho_{\Omega_{1,2}}$, $\rho_{\Omega_{1,3}}$, or $\rho_{\Omega_{1,4}}$) and the other indicated by a unique value of $\rho_{\Omega_2}$ (e.g. $\rho_{\Omega_{2,1}}$, $\rho_{\Omega_{2,2}}$, $\rho_{\Omega_{2,3}}$, or $\rho_{\Omega_{2,4}}$). Each of these values are predefined according to the tone format being used, and can be stored in a table in a storage unit, such as, for example, storage 100 (in FIG. 5) or a memory unit elsewhere within tone detector 14. In this example, the table would store each of the 16 symbols and their corresponding values for $\rho_{\Omega_1}$ and $\rho_{\Omega_2}$. In operation, when a multicomponent tone corresponding to target point 122 is provided to tone detector 14 (such as by transmitter/receiver 12), tone detector 14 is able to detect the presence of the multicomponent tone and identify if a valid symbol corresponding to target point 122 is indicated.

For example, referring to FIG. 7, assume that target point 122 corresponds to a symbol whose tone is being input into tone detector 14. Therefore, a tone having components $\rho_{\Omega_{1,3}}$ and $\rho_{\Omega_{2,4}}$ (or within some tolerance of these values) is being input as x'(n) to tone detector 14. Initially, starting point 120 (which may be arbitrarily chosen as the starting point) having components $\rho_{\Omega_{1,1}}$ and $\rho_{\Omega_{2,3}}$ is provided as a starting point which, in combination with the current received sample x'(n), is used to estimate values for $\rho_{\Omega_1}$ and $\rho_{\Omega_2}$, denoted as $\rho'_{\Omega_1}$ and $\rho'_{\Omega_2}$, respectively. (Note that the calculations of these values will be provided below.) In the current example, it is assumed that the above estimations provide values corresponding to point 125 of the grid of FIG. 7, where $\rho'_{\Omega_1}$ is determined to be some value between $\rho_{\Omega_{1,3}}$ and $\rho_{\Omega_{1,4}}$ (but closer to $\rho_{\Omega_{1,3}}$ than to $\rho_{\Omega_{1,4}}$) and $\rho'_{\Omega_2}$ is determined to be some value between $\rho_{\Omega_{2,2}}$ and $\rho d\Omega_{2,3}$ (but closer to $\rho_{\Omega_{2,2}}$ than to $\rho_{\Omega_{2,3}}$). Tone detector 14 then determines which symbol of the current tone format is closest to the estimated point 125. In the example of FIG. 7, the symbol corresponding to point 124 is closest (as compared to any other points, such as points 130, 132, and 134).

Point 124 is therefore fed back such that tone detector 14 uses point 124, in combination with the next received sample x'(n) to determine new estimated values for $\rho_{\Omega_1}$ and $\rho_{\Omega_2}$ (i.e. new values for $\rho'_{\Omega_1}$ and $\rho'_{\Omega_2}$). In the current example, the new estimated values correspond to estimated point 128, which is closest to target point 122 (as indicated by minimum distance 126). Therefore, target point 122 is fed back such that tone detector 14 uses point 122, in combination with the next received sample x'(n) to determine new estimated values for $\rho_{\Omega_1}$ and $\rho_{\Omega_2}$. In the current example, the new estimated values correspond to estimated point 129 which is also closest to target point 122. If, after a predetermined number of iterations, the new estimated values ($\rho'_{\Omega_1}$ and $\rho'_{\Omega_2}$) provide for points which are closest to a same point (such as target point 122 in the current example), then a tone lock is indicated. Therefore, if a tone is being provided to tone detector 14, tone detector 14 iteratively repeats new estimations for $\rho_{\Omega_1}$ and $\rho_{\Omega_2}$ using the incoming signal x'(n) which allows the estimations to converge to the current tone. If no valid tone is present in x'(n), then the estimations for $\rho_{\Omega_1}$ and $\rho_{\Omega_2}$ will not converge and no tone will be detected. Details of these calculations will be provided in reference to FIGS. 8-10 in combination with FIGS. 2-5.

Note that the examples of FIGS. 6 and 7 illustrate two-dimensional graphs where each symbol corresponds to a tone having two frequency components. However, in alternate tone formats, each tone may have more than two frequency components. For example, a tone format in which each tone includes three frequency components may be graphed on a three dimensional graph. Also, in some tone formats, each tone may not only include frequency components, but may also include amplitude components. In this case, each tone may correspond to predefined values of a function of the frequency (such as $\rho_{\Omega_1}$, $\rho_{\Omega_2}$ etc.) in addition to predefined values of a function of the amplitude (such as $\rho_{A_1}$, $\rho_{A_2}$, etc.). Therefore, each tone format may have a corresponding table in which symbols of the tone format are defined by predefined values related to frequency and amplitude. Thus, tone detector 14 defines a universal (i.e. generic) detector that may be used to detect and identify tones within a variety of different tone formats simply by using different tables of information corresponding to different tone formats. That is, the same system (and algorithm) may be used to detect tones of different tone formats simply by storing different tables corresponding to the different tone formats and selecting a different table for each tone format. Also, the tone format may define each symbol as having frequency components whose frequency bands do not overlap (such as the DTMF tone format), or alternatively, the tone format may define each symbol as having a plurality of frequency components having overlapping frequency bands (such as the MF-R1 or MF-R2 tone formats). (Note that the embodiments described herein estimate frequency components as a function of frequency, such as $\rho_{\Omega_1}$, $\rho_{\Omega2}$, etc.; however, alternate embodiments may estimate the frequency components as the frequency itself rather than a function of the frequency.)

FIG. 2 illustrates, in block diagram form, tone detector 14 in accordance with one embodiment of the present invention. Input signal x'(n) is received by pre-processing unit 26 (if present). If present, pre-processing unit 26 can perform different types of preprocessing of input signal x'(n) to produce preprocessed input signal x(n). Therefore, in alternate embodiments, no pre-processing is performed, and input signal x'(n) would be provided directly as input signal x(n) to filters 28 through 32. In the illustrated embodiment of FIG. 2, though, pre-processing unit 26 is present and will be discussed in more detail in reference to FIGS. 3 and 8 below. Pre-processing unit 26 of FIG. 2 also determines if the signal power is large enough for further processing, and if not, the value of the current symbol, m', is set to 0 (indicating an invalid digit in the current embodiment) and provided via conductor 40 to tone detection decision unit 38, thus bypassing the normal signal processing of x(n) between pre-processing unit 26 and tone detection decision unit 38. (Note that in the current embodiment, a value of 0 for m' is used to indicate an invalid digit; however, in alternate embodiments other values can be used to indicate an invalid digit.)

Preprocessed input signal x(n) is provided to filter$_1$ 28 through filter$_N$ 32, and then to AM-FM demodulator$_1$ 30 through AM-FM demodulator$_N$ 34 respectively. Each of AM-FM demodulator$_1$ 30 through AM-FM demodulator$_N$ 34 provides values for $\rho'_{\Omega_1}$, $\rho'_{A_1}$ through $\rho'_{\Omega_N}$, $\rho'_{A_N}$, respectively. Tone detector 14 can therefore have any number of filters and AM-FM demodulators as needed. Generally, one filter and AM-FM demodulator is needed for the number of frequency components of a tone within a particular tone format. For example, in the DTMF format where each symbol has two frequency components, one filter and one AM-FM demodulator is used for each frequency component (one for the high frequency component and one for the low frequency component). Therefore, in the DTMF format, 2 filters and 2 AM-FM demodulators are used. Each filter provides a signal containing the desired frequency to its corresponding AM-FM demodulator. The corresponding AM-FM demodulator produces measured or estimated values of $\rho_{\Omega_1}$ and $\rho_{\Omega_2}$ (the measured or estimated values denoted as $\rho'_{\Omega_1}$ and $\rho'_{\Omega_2}$) based on the current received sample of x(n) and on a current digit value, m. These estimated values $\rho'_{\Omega_1}$ and $\rho'_{\Omega_2}$ and the stored tables corresponding to the DTMF tone format are then used by self-tuning unit 36 to determine a next digit value (m) which is provided to tone detection decision unit 38 (as m', where m'=m or 0, as will be described below) and fed back to filter$_1$ 28 through filter$_N$ 32 for use with the next received sample of x(n).

Tone detection decision unit 38 then validates the received input digits, m', to determine when a valid DTMF symbol is detected and outputs this detected symbol to control bus 22 via conductor 50. That is, as will be described below, a digit, m', is provided on a sample basis. In the current example, a sampling rate ($f_s$) of 8 kHz for x(n) is assumed. Therefore, a sample for x(n) is received every 125 microseconds (μs). However, a valid DTMF symbol is only detected after a particular digit has been received for a minimum amount of time (e.g. 40 milliseconds (ms)), following a valid "pause," and with minimal interruptions (interruptions whose total duration does not exceed 10 ms). These details will be discussed in more detail in reference to the flow diagrams of FIGS. 9-10. Therefore, as used herein, "digit" will refer to the value of m determined on a sample basis, and "symbol" will refer to a detected valid symbol based on a sequence of digits received over multiple samples.

Figure 8:
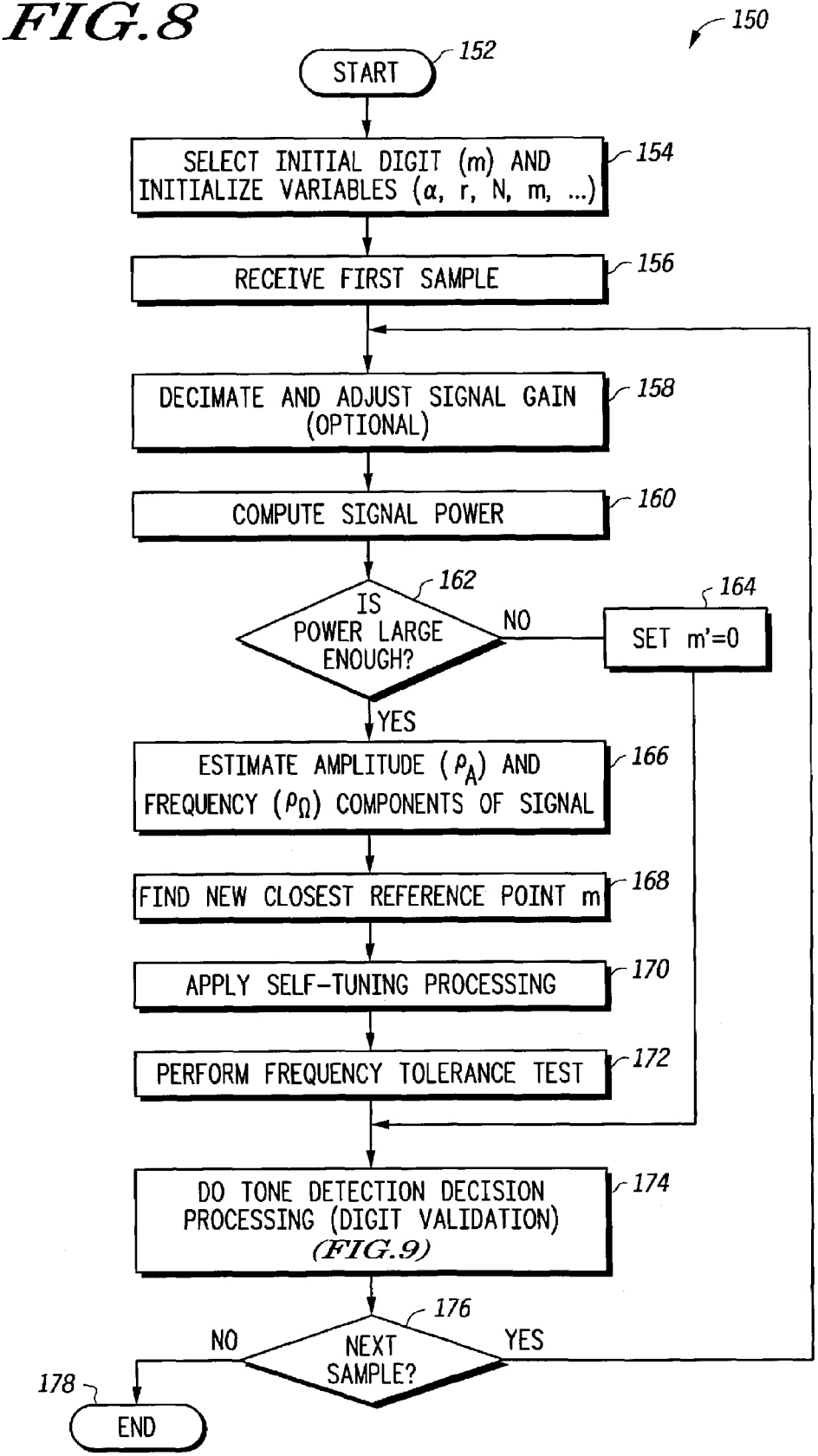
FIG. 8 illustrates, in flow diagram form, a method of detecting a multicomponent tone.
Figure 9:
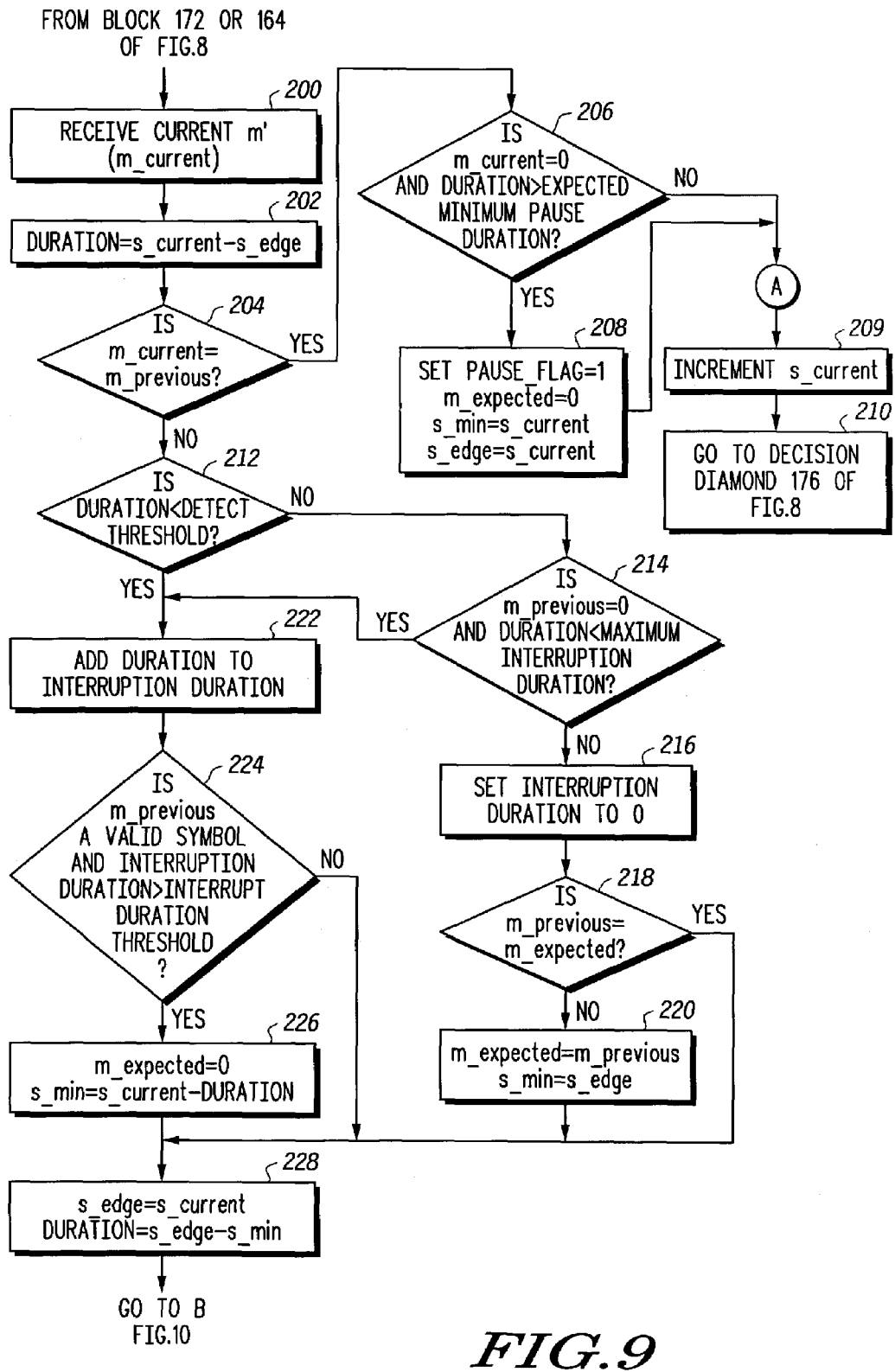
FIGS. 9-10 illustrate, in flow diagram form, a method of validating the detection of a multicomponent tone of FIG. 8.
Figure 10:
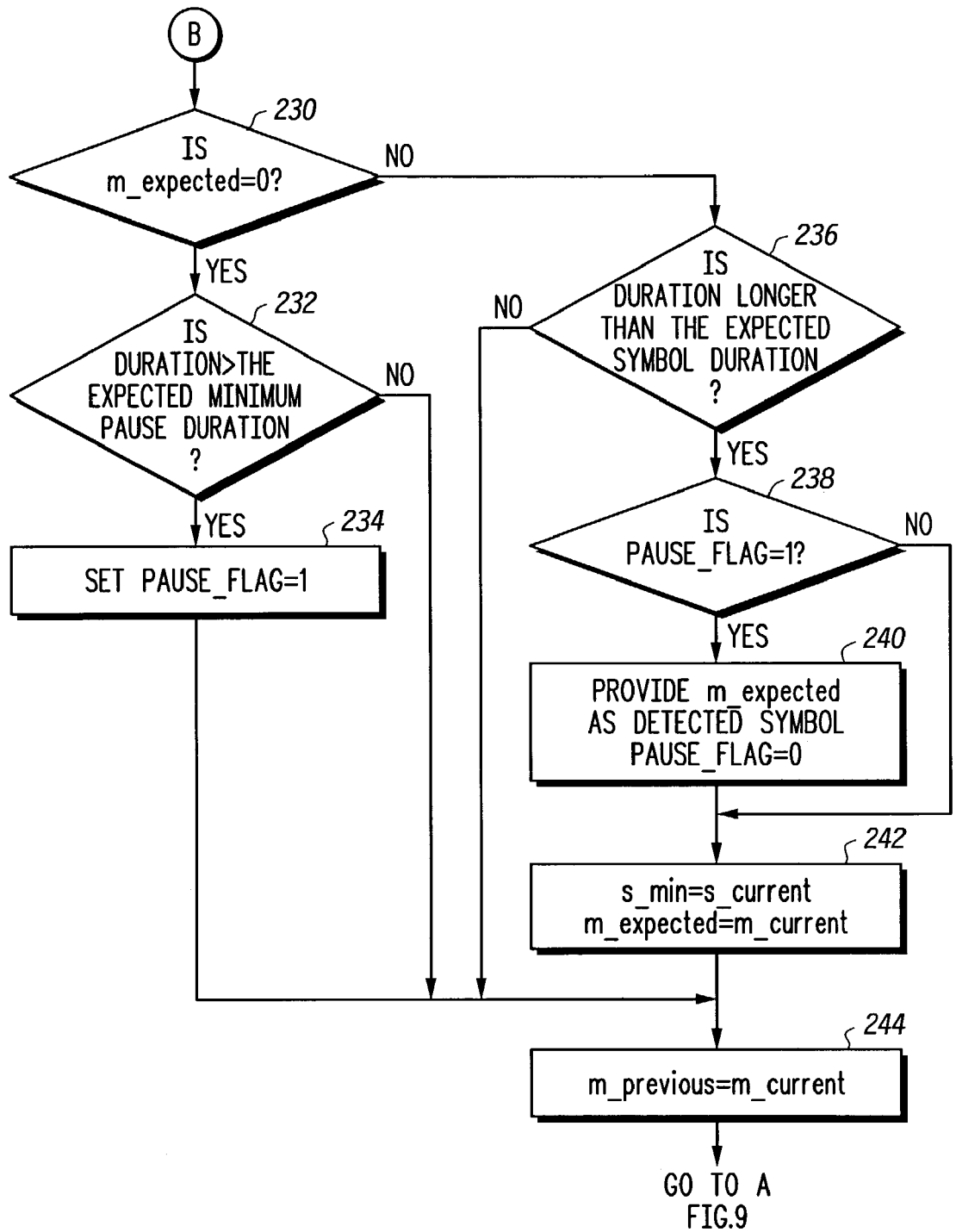

The details of the operation of FIGS. 2-5 can better be understood in reference to the flow diagrams of FIGS. 8-10. FIG. 8 illustrates a flow 150 corresponding to a method of detecting a multicomponent tone, in accordance with one embodiment of the present invention. Flow 150 begins with start 152 and proceeds to block 154 where the current digit, m, and other variables (e.g. α, r, N, etc.) are initialized. In one embodiment, m can be initialized to any symbol, such as, for example, the symbol corresponding to starting point 120. Starting point 120 may be arbitrarily chosen or may be chosen according to a predetermined algorithm. Alternatively, any point may be used as the starting point. For example, any of the symbols at the "+"s of FIG. 7 can be used as a starting point instead. Block 154 can be performed at the start of each communication session (e.g. phone call), for example. That is, the initializations need not be performed on a sample basis.

Flow then proceeds to block 156 where a first sample, x'(n), is received (where n refers to the current sample). Note that the sampling rate used herein is 8 kHz, but other communications systems may have different sampling rates. Flow then proceeds to blocks 158 and 160, and decision diamond 162. Note that the steps within block 158 and 160 and decision diamond 162 may be performed by pre-processing unit 26 of FIG. 2, illustrated in more detail in FIG. 3. Flow first proceeds to block 158 where the input signal x'(n) may be decimated and have its signal gain adjusted. Note that these steps are optional.

Therefore, referring to FIG. 3, x'(n) is provided to decimator 62 and AGC 64 (if present) to produce a decimated and gain adjusted input signal x(n) (i.e. x(n)=G x'(k n)). Note that the flow of FIG. 8 may therefore use sub-rate processing such that the flow is only performed every k samples where k corresponds to decimator 62. Therefore, decimator 62 is used to reduce computation complexity such that only every k-th sample is processed. For example, in one embodiment, k=2 where only every other input sample is processed. However, k can be any value (including 1, which indicates that sub-rate processing is not used because every sample is processed). Therefore, every k-th sample may be considered as a sub-rate sample. However, in the equations used herein, x(n) will be used where if decimator 62 is present, n refers to the sub-rate sample. AGC 64 may be used in order to improve the dynamic range by amplifying the input samples. In one embodiment, this may be done by shifting the variables such that the gain varies between 1 and 8. Note that in one embodiment, the gain of x'(n) is monitored before amplification such that it can be reduced if needed to avoid clipping. For a DTMF detector based on the current embodiment, this amplitude modulation causes a transient period that is negligible. Also, for a DTMF detector based on the current embodiment, without AGC 64, 16-bit rounded variables limit the detector to 18 dB whereas with AGC 64, the dynamic range becomes greater than 25 dB. As can be seen in reference to FIG. 3, if decimator 62 and AGC 64 are not present, x'(n) is provided directly (i.e. unmodified) as x(n) to filter$_1$ through filter$_N$. (Note also that if AGC 64 is not present, the samples of the input signal, x'(n), need not be stored. That is, without AGC 64, no buffering of the input signal is needed.)

Referring back to flow 150 of FIG. 8, flow proceeds from block 158 to block 160 where the power ($P_x$) of the input signal x(n) is computed. If, at decision diamond 162, the power is large enough to proceed processing, flow proceeds from decision diamond 162 to block 166. However, if the power is not large enough to proceed, flow proceeds from decision diamond 162 to block 164 where m' is set to 0 (indicating an invalid digit) and flow proceeds to block 174, bypassing blocks 166, 168, 170, and 172. Therefore, referring back to pre-processing unit 26 of FIG. 3, x(n), at the output of AGC 64, if present, is provided to energy calculation unit 66 where the energy (i.e. power) is computed (block 160). One embodiment uses a polynomial function of the tone, such as, for example, a modified Teager-Kaiser energy operator as shown below in equation 1:

$$\psi_k(x(n)) = x^2(n-k) - x(n)x(n-2k) \quad \text{Equation 1}$$

When x(n) is a single component tone, i.e. when x(n)=A cos(nΩ+φ), $\psi_k(x(n))=A^2 \sin^2(k\Omega)$ which depends on both the magnitude A and the normalized frequency Ω of the tone (where Ω=2πf/f$_s$, where f is the tone frequency and f$_s$ is the sampling frequency). Note that $\psi_k(x(n))$ does not depend on the phase φ. The parameter k defines the underlying sub-rate processing. However, the effect of applying $\psi_k(\cdot)$ at a sampling rate f$_s$ is equivalent to applying $\psi_1(\cdot)$ at a sampling rate f$_s$/k. As discussed above, sub-rate processing may be used to reduce computational requirements; however, sub-rate processing is optional. The output of energy calculation unit is then provided to LPF 68 to filter out noise. For example, in one embodiment, a single pole LPF of the form shown in equation 2 below is used.

$$A(z) = \frac{1-\alpha}{1-\alpha z^{-1}}, \ 0 < \alpha < 1 \quad \text{Equation 2}$$

The filter output, $P_x$, of LPF 68 is provided to energy detector 70 which may be used to determine if the power is large enough (decision diamond 162). Energy detector determines whether the energy, $P_x$, of x(n) is large enough by comparing it to a minimum energy threshold. For example, in one embodiment, this minimum energy threshold is set to 1/64. If the energy of x(n) is determined to be less than the minimum energy threshold, then energy detector 70 sets m' to 0 and provides m' via conductor 40 of FIG. 2 to tone detection decision unit 38, bypassing filter$_1$ 28 through filter$_N$ 32, AM-FM demodulator$_1$ 30 through AM-FM demodulator$_N$ 34, and self-tuning unit 36.

Note that in equation 1 above, x(n) is composed of one frequency; however, the Teager-Kaiser energy operator can be extended to cover the case where x(n) is composed by more than one frequency. In this case, x(n)=

$$\sum_{i=1}^{N}$$

such that $$\sum_{i=1}^{N}$$

where the function φ(•) makes the energy operator time-varying, thus imposing additional difficulty to separate the N components. It can be shown that φ(•) is given by:

$$2\sum_{t<s}$$

An important case to consider is when $\Omega_i=\Omega$ and $A_i=g_iA$ for all components, which makes φ(•) independent of n. In this case, the energy operator of x(n) becomes $$\psi_k(x(n)) = \frac{1}{g_c}\left(\sum_{i=1}^{N} g_i^2 + 2\sum_{t<s} g_t g_s \cos(\phi_t - \phi_s)\right)\psi_k(x_c(n)),$$

c=1, ..., N which means that if multiple components have the same frequency, but different gain and delay with respect to a given reference component c, then the energy operator of the signal x(n) is simply a scaled version of the energy operator of a reference component $x_c(n)=A_c \cos(n\Omega_c+\phi_c)$, c=1, ..., N. This scaling constant, $$\frac{1}{g_c}\left(\sum_{i=1}^{N} g_i^2 + 2\sum_{t<s} g_t g_s \cos(\phi_t - \phi_s)\right),$$

is effectively removed when the ratios ρ are determined (e.g., $\rho'_\Omega$, described in more detail below). This result implies that the energy operator $\psi_k(\cdot)$ is able to handle multiple echoes of a single-frequency tone.

Therefore, as will be described in more detail below in reference to FIGS. 2 and 8, this energy operator may be used to detect multiple components by first filtering the signal x(n) with N independent filters such that every component $x_c(n)$ can be efficiently extracted. Once the N components are extracted, their magnitude and frequency estimates ($\rho'_{\Omega_i}$ and $\rho'_{A_i}$) are computed.

Referring back to FIG. 8, if the power was large enough (at least the minimum energy threshold), flow proceeds from decision diamond 162 to block 166 where amplitude ($\rho_A$) and frequency ($\rho_\Omega$) components of the input signal x(n) are estimated (to determine $\rho'_\Omega$ and $\rho'_A$). Block 166 of FIG. 8 will be described in more detail in reference to FIG. 2 and FIG. 4. As above, the DTMF tone format will be used as an example for ease of explanation. Therefore, FIG. 2, for use with DTMF, includes two paths for x(n) (corresponding to N=2): one through filter$_1$ 28 and AM-FM demodulator$_1$ 30 and another through filter$_2$ (not shown) and AM-FM demodulator$_2$ (not shown). Since the DTMF tone format corresponds to tones with two frequency components, the output of AM-FM demodulator$_1$ 30 provides an estimated value for $\rho_{\Omega_1}$ (denoted as $\rho'_{\Omega_1}$) and the output of AM-FM demodulator$_2$ provides an estimated value for $\rho_{\Omega_2}$ (denoted as $\rho'_{\Omega_2}$). Magnitude estimates $\rho'_{A_1}$ and $\rho'_{A_2}$ are not used in the current example, but they may be included as part of the detection process, if needed. For ease of explanation, the calculations will be described in reference to filter$_1$ 28 and AM-FM demodulator$_1$ 30.

Filter$_1$ 28 filters x(n) such that a first component $x_1(n)$ can be extracted. Similarly, filter$_2$ filters x(n) such that a second component $x_2(n)$ can be extracted. Therefore, each filter is used to extract a corresponding component $x_c(n)$, also referred to as a tone component. (Therefore, in the case of a tone format in which each tone includes N=5 components, 5 filters are present where each is used to extract a corresponding tone component.) Once the components are extracted, $\rho'_{\Omega_1}$ and $\rho'_{\Omega_2}$ are determined. For example, in one embodiment, comb filters are used for each of filter$_1$ and filter$_2$ such that a given filtering path removes all the undesirable components from the other paths. For example, referring back to FIG. 7 where the starting value of m is provided as starting point 120 corresponding to $\rho_{\Omega_{1,1}}$ and $\rho_{\Omega_{2,3}}$ (indicating that m was initialized to starting point 120), filter$_1$ (corresponding to the first frequency component $\rho_{\Omega_1}$) is a comb filter which filters out the frequency corresponding to $\rho_{\Omega_{2,3}}$ such that if a tone corresponding to point 120 is present in x(n), only the first component of x(n) corresponding to $\rho_{\Omega_{1,1}}$ (i.e. $x_1(n)$) is provided to AM-FM demodulator$_1$ without the second component corresponding to $\rho_{\Omega_{2,3}}$. Similarly, filter$_2$ (corresponding to the second frequency component $\rho_{\Omega_2}$) is a comb filter which filters out the frequencies corresponding to $\rho_{\Omega_{1,1}}$ such that only the second component of x(n) corresponding to $\rho_{\Omega_{2,2}}$ (i.e. $x_2(n)$) is provided to AM-FM demodulator$_2$ without the first component corresponding to $\rho_{\Omega_{1,1}}$. In this manner, each AM-FM demodulator calculates its corresponding values of $\rho'_\Omega$ without the other frequency components of the tone corresponding to the current value of $\rho'_\Omega$ being present. Therefore, a comb filter for each filter$_c$ (c=1, . . . , N) can have a general format as shown below in equation 3.

$$H_c^{(m)}(z) = \Gamma_c^{(m)} \prod_{i \neq c, i=1}^{N} \frac{1 - b_{i,j}z^{-1} + z^{-2}}{1 - rb_{i,j}z^{-1} + r^2z^{-2}}, \quad c = 1, \cdots, N \quad \text{Equation 3}$$

In the above equation, 0<r<1, and a product term exists for each of i=1 to N, for i≠c. Therefore, in the case of DTMF tone format where N=2 (two frequency components), only one product term for each filter would exist. For c=1, only a product term corresponding to i=2 would be present, and for c=2, only a product term corresponding to i=1 would be present. (In the case of a tone format having three frequency components, each filter's transfer function, H, would include a product of two terms.) Also, in the above equation, $b_{i,j}=2 \cos(\Omega_{i,j})$ where i corresponds to the index of the product terms (and is≠c), and j is a function of the current digit m, where j corresponds to a value 1, 2, 3, or 4 depending on the current digit m. For example, in the case of starting point 120, filter$_1$ (corresponding to c=1) would have a transfer function of the form $$H_1^{(m)}(z) = \Gamma_1^{(m)} \frac{1 - b_{2,3}z^{-1} + z^{-2}}{1 - rb_{2,3}z^{-1} + r^2z^{-2}}.$$

Note that in this example, i is 2 because the product is performed for i=1 to 2, for i≠c, leaving only a single product term corresponding to i=2. Also, $b_{2,3}=2\cos(\Omega_{2,3})$ where j=3 because the current digit m (corresponding to starting point 120) has a second component at $\rho_{\Omega_{2,3}}$ where the number 3 in the subscript of $\Omega$ corresponds to the value assigned to j. (Note that this value of 3, i.e. the second number in the subscript of $\Omega$, depends on the value of the current digit m. If the current digit m corresponds to the point right below starting point 120, then j would be assigned the value of 2.) Note that in the current embodiment, the coefficients of the comb filters are adaptive and therefore change depending on the current digit m.

Therefore, each filter filters out all frequency components except for one of the frequency components corresponding to the current value of m (which, in the current example of FIG. 7, is starting point 120). In one embodiment, $\Gamma_c^{(m)}$ is chosen such that $|H_c^{(m)}(e^{j\Omega_{c,j}})|=1$, i.e. the removal of the unwanted components i≠c does not introduce gain bias on the target component c. It can be shown that:

$$\Gamma_c^{(m)} = \sqrt{\prod_{i \neq c} \frac{\left(\frac{1-r^2}{2}\right) - r[r\cos(\Omega_{c,j}) - \cos(\Omega_{i,j})][r\cos(\Omega_{i,j}) - \cos(\Omega_{c,j})]}{[\cos(\Omega_{c,j}) - \cos(\Omega_{i,j})]^2}}$$

For the two-component case (N=2), note that $\Gamma_1^{(m)}=\Gamma_2^{(m)}$ $\forall$m. The values of $\Gamma_c^{(m)}$ and the coefficients $b_{c,j}$, c=1, . . . , N, can be pre-computed and stored in a look-up table. If magnitude estimations are not used, the gains $\Gamma_c^{(m)}$ may be ignored.

In order to successfully detect a given multi-component tone, a self-tuning mechanism is used for searching the optimal set of frequencies that minimizes variability of the frequency detector outputs. This is so because a single frequency tone generates a constant value after being processed by the Teager-Kaiser energy operator. The operation of self-tuning unit 36 will be described below.

Each comb filter therefore allows only those components of x(n) corresponding to the frequency components of the current digit, m, to be provided to the AM-FM demodulators. Therefore, AM-FM demodulator$_1$ 30 receives $x_1(n)$ which corresponds to the frequency $\Omega_1$ of the first frequency component $\rho_{\Omega_{1,1}}$ of m (which is starting point 120 in the current example). AM-FM demodulator$_2$ receives $x_2(n)$ which corresponds to the frequency $\Omega_2$ of the second frequency component $\rho_{\Omega_{2,3}}$ of m. AM-FM demodulator$_1$ 30 receives $x_1(n)$ and determines $\rho'_{\Omega_1}$ as illustrated in FIG. 4.

Referring to FIG. 4 which illustrates an embodiment of AM-FM demodulator$_1$ 30, $x_1(n)$ is provided to two-point moving average unit 72 and energy calculation unit 78 via conductor 44. Note that depending on the magnitude A of the input tone, the energy operator, $\psi_k(\cdot)$, generates different levels for the same normalized frequency Ω. Therefore, in order to estimate Ω, this magnitude dependency needs to be removed (i.e. extracted). Therefore, two-point moving average unit 72 is used to remove the magnitude dependency from the incoming signal. This can be done as shown in equation 4 below.

$$\frac{1}{2}(x_1(n-d_1)+x_1(n-d_2)) \quad \text{Equation 4}$$

Note that in the above equation, $d_1$ represents a first delay value and $d_2$ represents a second delay value such that an average is determined between two samples of $x_1(n)$ spaced "$d_1$-$d_2$" apart. Energy calculation unit 74 then determines the energy of the two-point moving average received from two-point moving average unit 72, as seen in the following equation.

$$\psi_k\left(\frac{1}{2}(x_1(n-d_1)+x_1(n-d_2))\right) \quad \text{Equation 5}$$

Similarly, energy calculation unit 78 determines the energy of the incoming signal component $x_1(n)$, as seen below in equation 6.

$$\psi_k(x_1(n)) \quad \text{Equation 6}$$

Therefore, note that in the current embodiment, a modified Teager-Kaiser energy operator, as was used above in pre-processing unit 26, may also be used in AM-FM demodulator$_1$ 30. The outputs of energy calculation unit 74 and energy calculation unit 78 are provided to LPF 76 and LPF 80, respectively. Each of LPF 76 and LPF 80 may be implemented with equation 2 above and operate to remove noise from the signals in order to achieve better tone detection. The output of LPF 80 is provided to multiplier 90 and inverse estimation unit 82. Inverse estimation unit 82 is therefore used to estimate $1/\psi_k(x_1(n))$.

The outputs of LPF 76 and inverse estimation unit 82 are provided to multiplier 84 whose output is provided to LPF 86 in order to smoothen the result. Therefore, the output of LPF 86 provides $\rho'_{\Omega_1}$, which can be expressed as follows.

$$\rho'_{\Omega_1} = \frac{\psi_k\left(\frac{1}{2}(x_1(n-d_1)+x_1(n-d_2))\right)}{\psi_k(x_1(n))} = \cos^2\left(\left(\frac{d_1-d_2}{2}\right)\Omega_1\right) \quad \text{Equation 7}$$

Note that the value of $\rho'_{\Omega_1}$ is then used to determine $\rho'_{A_1}$ (if necessary). Note that in the embodiment used for DTMF tone format, amplitude component measurements are not necessary; however, for alternate tone formats, both frequency and amplitude components may be needed. Therefore, the output of LPF 86 ($\rho'_1$) is provided to adder 88 so that it may be subtracted from 1 to produce "$1-\rho'_{\Omega_1}$". The output of adder 88 is provided to inverse estimation unit 89, which estimates $1/(1-\rho'_{\Omega_1})$ and provides this result to multiplier 90. Multiplier 90 multiplies the output of LPF 80, $\psi_k(x_1(n))$, with the output of inverse estimation unit 89 and provides the result to LPF 92 in order to smoothen the result. Therefore, the output of LPF 92 provides $\rho'_{A_1}$ which can be expressed as follows:

$$\rho'_{A_1} = \frac{\psi_k(x_1(n))}{1-\rho'_{\Omega_1}} \quad \text{Equation 8}$$

Note that each of LPFs 76, 80, 86, and 92 receives the parameter α, which influences the bandwidth of the low pass filters. If its value is close to 1, it will decrease the bandwidth. Therefore, different values of α may be used depending on the bandwidth desired. For example, one embodiment uses two values for α, depending on the bandwidth desired. For example, a smaller bandwidth may be desired once a same digit m is selected as a new digit for a predetermined amount of iterations, as will be seen in reference to self-tuning unit 36. Therefore, in one embodiment, α is set to 0.88 for normal operation, and once a smaller bandwidth is desired, α may be changed to a value such as 0.92. Alternatively, depending on the tone format, different values for α may be used for each filter.

Also note that one embodiment of inverse estimation units 82 and 89 uses a polynomial approximation to compute a ratio q=N/D between a numerator N and a denominator D, as shown in the following equation.

$$q = \frac{N}{D} = \frac{2N}{2D} = \frac{2N}{2D2^b 2^{-b}} = N\left(\frac{1}{2D2^b}\right)2^{b+1} = Np(D')2^{b+1} \quad \text{Equation 9}$$

In the above equation $D'=D2^b$ is the denominator normalized to the range between ½ and 1, b is the corresponding number of leading bits of the normalization, and p(•) is a polynomial approximation of the function f(x)=½x for ½≤x≤1. In the current embodiment, a third order polynomial is selected, such that:

$$q = N(a_3 + D'(a_2 + D'(a_1 + D'a_0)))2^{b+4} \approx \frac{N}{D} \quad \text{Equation 10}$$

In the above equation, the coefficients are normalized to a range between −1 and +1 resulting in an additional 3 shifts (i.e. $2^{b+1}$ changes to $2^{b+4}$). One embodiment uses the following normalized coefficients: $a_0$=−0.2248, $a_1$=0.6695, $a_2$=−0.7357, and $a_3$=0.3532. Therefore, inverse estimation units 82 and 89 can use this approximation to efficiently and effectively estimate the inverse.

The same descriptions above also apply to AM-FM demodulator$_2$ (not shown) to produce $\rho'_{\Omega_2}$ and $\rho'_{A_2}$ (and AM-FM demodulator$_N$ 34 to produce $\rho'_{\Omega_N}$ and $\rho'_{A_N}$). These values are then provided to self-tuning unit 36, as can be seen in FIG. 2 via conductors 46 and 54.

Referring back to flow 150 of FIG. 8, flow proceeds from block 166 to blocks 168, 170, and 172, all of which may be performed by self-tuning unit 36. In block 168, a new digit m is determined. Flow proceeds to block 170 where self-tuning processing is applied, and then flow proceeds to block 172 where frequency tolerance test is performed. These steps will be described in further detail in reference to FIG. 5, which illustrates one embodiment of self-tuning unit 36.

Referring to FIG. 5, minimum distance detector 102 is coupled to receive information from storage 100 and coupled to receive inputs $\rho'_{\Omega_1}$, $\rho'_{A_1}$ through $\rho'_{\Omega_N}$, $\rho'_{A_N}$. Storage 100 contains the tables corresponding to the tone formats as described above. For example, for DTMF tone format tone detection, storage 100 includes a table having each of the 16

DTMF symbols and the two corresponding frequency components for each symbol. For the general case of FIG. 7, a table in storage 100 includes each of the 16 symbols of the tone format indicated by "+"s in FIG. 7 and each symbol's two corresponding frequency components. For example, the symbol corresponding to starting point 120 would be stored along with values for $\rho_{\Omega_{1,1}}$ and $\rho_{\Omega_{2,3}}$ (i.e. minimum, nominal and maximum values, depending on frequency tolerance requirements). Storage 100 may also store other values such as the $\alpha$ parameter for the low pass filters, or other parameter values for the equations described herein. Storage 100 may be located within self-tuning unit 36 or may be a memory external to tone detector 14.

Minimum distance detector 102 receives the inputs $\rho'_{\Omega_1}$, $\rho'_{A_1}$ through $\rho'_{\Omega_N}$, $\rho'_{A_N}$ and determines the closest symbol to the input values (corresponding to block 168 of FIG. 8). For example, in the example of FIG. 7 corresponding to a tone format having two frequency components (and no amplitude components), as with the DTMF tone format, minimum distance detector receives $\rho'_{\Omega_1}$ and $\rho'_{\Omega_2}$. These values are compared to the table corresponding to the appropriate tone format. In the current example, they would be compared to the table corresponding to the values of FIG. 7. In the current example, the values of $\rho'_{\Omega_1}$ and $\rho'_{\Omega_2}$ determined using starting point 120 correspond to point 125. That is, $\rho'_{\Omega_1}$ is between $\rho_{\Omega_{1,3}}$ and $\rho_{\Omega_{1,4}}$ and $\rho'_{\Omega_2}$ is between $\rho_{\Omega_{2,2}}$ and $\rho_{\Omega_{2,3}}$. Assuming $\rho'_{\Omega_1}$ is closer to $\rho_{\Omega_{1,3}}$ than to $\rho_{\Omega_{1,4}}$, and $\rho'_{\Omega_2}$ is closer to $\rho_{\Omega_{2,2}}$ than to $\rho_{\Omega_{2,3}}$, the closest symbol to point 125 is the symbol corresponding to point 124 (having frequency components $\rho_{\Omega_{1,3}}$ and $\rho_{\Omega_{2,2}}$). Therefore, the new value of m (i.e. the next digit) used for the subsequent iteration through flow 150 of FIG. 8 (and fed back to filter$_1$ 28 through filter$_N$ 32) is set to the symbol corresponding to point 124. Thus, $\rho_{\Omega_{1,3}}$ and $\rho_{\Omega_{2,2}}$ are used in the calculations of the next iteration. Note that tones of different formats can be detected by simply selecting the appropriate table from storage 100. Therefore, the same process described above in reference to DTMF and the example of FIG. 7 can be applied to any tone format. In addition to providing the closest symbol m, it also provides a frequency tolerance flag 112 to frequency tolerance tester 107. The frequency tolerance flag is set to one if all frequency component values are within predefined tolerance; otherwise, the frequency tolerance flag is set to zero, which indicates an invalid symbol.

The new value of m is provided, via conductor 110, to detection counter 104 and filter control 108. Filter control 108 modifies m and r, as necessary, and provides them back to filter$_1$ through filter$_N$. The new value of m determined by minimum distance detector (which may have been the same as the previous value of m) and a new value of r are provided by filter control 108. In one embodiment, r is simply a fixed value (e.g. 0.35) that is not modified throughout operation of tone detector 14. Note that r is used in the comb filter equation (equation 3) and affects the degree of rounding of the notches of the comb filter. That is, the notches of the comb filter can be made sharper or more-rounded depending on the value of r. Therefore, in some embodiments, filter control 108 may modify the value of r as desired.

Detection counter 104 receives the new value of m and is incremented if the new value of m is the same as the previous value of m. If the value of m has been the same value for a predetermined number of samples (or sub-rate samples, if sub-rate processing is used), then a tone lock is indicated. That is, if the measured values of $\rho'_{\Omega_1}$ and $\rho'_{\Omega_2}$ continuously provide the same symbol as the closest symbol (for a predetermined number of samples, such as, for example, 100 samples), then a lock on that symbol is indicated to LPF bandwidth controller 106. LPF bandwidth controller 106 modifies the value of $\alpha$ based on if a lock is achieved. Therefore, as mentioned above, the default value of $\alpha$ (e.g. 0.88) results in a particular bandwidth, and if a lock is achieved, the value of $\alpha$ can be modified (e.g. to 0.92) such that the bandwidth is reduced. This allows for a further reduction in noise once a particular digit is indicated as m for a sufficient number of samples. The value of $\alpha$ is then provided to AM-FM demodulator$_1$ through AM-FM demodulator$_N$ and used as described above. Therefore, the combination of detection counter 104, LPF bandwidth controller 106, and filter control 108 may be used to perform the self-tuning of block 170 of FIG. 8.

The value of m from filter control 108 and frequency tolerance flag 112 from minimum distance detector 102 are then provided to frequency tolerance tester 107. Frequency tolerance tester determines whether the estimated frequency components, $\rho'_{\Omega_1}$ to $\rho'_{\Omega_N}$, are within a predetermined tolerance of the frequency components of m. Depending on the tone format, $\rho'_{A_1}$ to $\rho'_{A_N}$ may also be required to pass specific tolerance requirements in terms of nominal level and maximum allowable variation around that. Therefore, in the current example of FIG. 7, the estimated frequency components of estimated point 128, which are closest to target point 122, are compared to the frequency components of target point 122 and their frequency tolerances. For example, in one embodiment, each symbol may have a frequency tolerance of 1.5%. In this case, if the frequency components, $\rho'_{\Omega_1}$ and $\rho'_{\Omega_2}$, of estimated point 128 are within $\rho_{\Omega_{1,3}}$+/−1.5% of $f_{1,3}$ and $\rho_{\Omega_{2,4}}$+/−1.5% of $f_{2,4}$, then the frequency tolerance flag is set to one and provided to frequency tolerance tester 107 through conductors 112 of FIG. 5, so that the value of m corresponding to target point 122 is provided (as m') to tone detector decision unit 38 for tone detection processing. However, if the frequency components are outside the allowable tolerances, the frequency tolerance flag 112 is set to zero, so that a value of 0 (i.e. invalid) is provided as m' to tone decision unit 38. Therefore, each value of m determined by minimum distance detector 102 is tested against the frequency tolerances before it is provided as m' for tone detection processing. (Note that this frequency tolerance testing is optional, and in alternate embodiments, every value of m determined by minimum distance detector 102 can be provided as m' for tone detection processing, without frequency tolerance testing.)

Referring back to FIG. 8, flow proceeds from block 172 to block 174 where tone detection decision processing (i.e. digit validation) is performed, as will be discussed in more detail in reference to FIG. 9 below. That is, self-tuning unit 36 (or pre-processing unit 26, in the case that processing is bypassed) provides a digit value for m' on a per sample basis. Therefore, upon tone detection decision unit 38 receiving m' each sample, this received value of m' is processed to determine if a valid symbol has been detected according to the current tone format. For example, as described above, a valid DTMF symbol can happen only after a pause is received, and then only if a particular digit (value of m') is received for at least a predetermined amount of time with no more than a predetermined amount of interruptions. Therefore, tone detection decision unit 38 processes the series of digits m' determined by self-tuning unit 36 and pre-processing unit 26 to determine when valid symbols are received via x(n). When a valid symbol is detected, it is output as detected symbol via conductor 50, as seen in FIG. 2. Note therefore that the digit values for m' are provided on a sample basis (which, in the example of an 8 kHz processed with a decimator of k=2, results in a digit value for m every 4 kHz).

Therefore, referring back to the example of FIG. 7 in which x(n) corresponds to a tone indicating the symbol at target point 122, the new value of m, corresponding to point 124, is provided as m back to filter$_1$ through filter$_N$. (If m passes the frequency tolerance testing, then it is provided as m' to tone detector decision unit 38; otherwise, a value of 0, indicating an invalid digit, is provided as m' to tone detector decision unit 38.) The process described above (in reference to FIG. 8) is then repeated, and in the example of FIG. 7, the new values of $\rho'_{\Omega_1}$ and $\rho'_{\Omega_2}$ result in estimated point 128. That is, the new value of $\rho'_{\Omega_1}$ occurs between $\rho_{\Omega_{1,3}}$ and $\rho_{\Omega_{1,4}}$ (but closer to $\rho_{\Omega_{1,3}}$ than to $\rho_{\Omega_{1,4}}$), and the new value of $\rho'_{\Omega_2}$ occurs between $\rho_{\Omega_{2,3}}$ and $\rho_{\Omega_{2,4}}$ (but closer to $\rho_{\Omega_{2,3}}$ than to $\rho_{\Omega_{2,4}}$). Estimated point 128, based on the table stored in storage 100, is determined to be closest to target point 122. Since in the current example it is assumed that the input signal x(n) is providing a tone corresponding to the symbol at target point 122, the process iterations converge towards target point 122, and upon providing the new value of m, corresponding to target point 122, back to filter$_1$ through filter$_N$, the new values of $\rho'_{\Omega_1}$ and $\rho'_{\Omega_2}$ based on this new m will result in another estimated point that is nearest to target point 122 (such as, for example, point 129). Once target point 122 is indicated a predetermined number of times (i.e. for a predetermined number of samples, such as, for example, for 100 samples), a tone lock will be indicated, and the LPF parameter α will be modified so as to decrease the bandwidth of the low pass filters.

Therefore, so long as a tone is being input to tone detector 14 corresponding to a valid symbol of the current tone format being detected, flow 150 of FIG. 8 will converge to the appropriate digit. However, if invalid tones, low power signals, or normal speech are received, then a tone lock will not be achieved because the values of m will not converge to a target point. Hence, a tone will not be detected until a valid tone is received. Also note that the same self-tuning unit 36 may be used to detect tones of various different tone formats by simply using an appropriate table in storage 100 corresponding the desired tone format.

Returning back to FIG. 8, flow proceeds from block 174 to decision diamond 176 where it is determined if there is a next sample of x'(n). If not, flow ends at block 178. However, if another sample is received, flow returns to block 158 where the process continues, as described above, using the new value of m and the next received sample.

Note that the flow of FIG. 8 can be used to detect multi-component tones of a variety of different tone formats. That is, the same flow of FIG. 8 can be use to detect a tone (and therefore a corresponding symbol) of a first tone format by using a first table corresponding to the first tone format and a tone (and corresponding symbol) of a second tone format by using a second table corresponding to the second tone format. Both the first and second tables can be stored in storage 100 and selected as needed. Also, the illustrated embodiment of tone detection of FIG. 8 is non-linear and does not require Fourier transform computations. Since no Fourier computations are required, the amount of time required to estimate a frequency component of tone component, $x_c(n)$, is independent of the frequency of the tone component, $x_c(n)$. For example, for those methods which utilize standard Fourier transform methods, a low frequency tone requires a long buffer (for receiving and storing more samples of the input signal) in order to obtain sufficient accuracy for obtaining the frequency. However, in the current embodiment illustrated in FIG. 8 using a polynomial function of the tone (such as the modified Teager-Kaiser energy operator), changes in frequency affects the level of the $\cos^2(\bullet)$ result (see equation 7 above) of the frequency component but does not affect the number of samples needed of the input signal x'(n).

FIGS. 9 and 10 illustrate a method of processing the received digits m' from block 172 or block 164 of FIG. 8 in accordance with one embodiment of the present invention. The embodiment of FIGS. 9 and 10 represent one example of processing received digits m' in accordance with the DTMF tone format. Many different embodiments may be used to appropriately process the received digits in accordance with the DTMF format. Also, other embodiments may replace the method of FIGS. 9 and 10 with other digit processing methods in accordance to the tone formats being detected. Note that the following description of FIGS. 9 and 10 will be made according to the DTMF tone format.

The DTMF standard (ITU-T Q.24), with respect to signal reception timing, states the following:

The exchange should recognize signals whose duration exceeds the minimum expected value from subscribers. To guard against false signal indications the exchange should not respond to signals whose duration is less than a specified maximum value. Similarly, pause intervals greater than a specified minimum value should be recognized by the exchange. To minimize erroneous double-registration of a signal if reception is interrupted by a short break in transmission or by a noise pulse, interruptions shorter than a specified maximum value must not be recognized. The maximum rate at which signals can be received (signaling velocity) may be related to the above minimum values. All of these values may also be determined by subscriber feature requirements.

The ITU-T Q.24 document also provides the following requirements for signal reception timing: 1) valid signals with at least 40 ms of duration should be detected, 2) valid signals with a duration smaller than 23 ms should be rejected, 3) the pause duration should be at least 40 ms, 4) the signal should not be interrupted by more than 10 ms, and 5) the signaling velocity should be at least 93 ms/digit. The flow diagrams of FIGS. 9 and 10 therefore illustrate one example of the implementation of the ITU-T Q.24 DTMF standard. Some of the values used in the flow diagrams of FIGS. 8-10 include a detection threshold (10 samples), interruption duration (40 samples), expected minimum pause duration (70 samples), and expected symbol duration (110 samples). Note that the above numbers correspond to a sampling rate of 4 kHz due to pre-processing unit 26 decimating the signal by 2. Therefore, in the current embodiment, 10 samples corresponds to 2.5 ms, 40 samples corresponds to 10 ms, 70 samples to 17.5 ms, and 110 samples to 27.5 ms. Note that these numbers are not exactly the same as those provided above from the ITU-T Q.24 document, as they are adjusted to take into account the specific behavior of the current implementation illustrated in FIGS. 9 and 10. Note also that alternate embodiments may use different values or different variables all together, depending on the implementation.

The flow of FIG. 9 begins with block 200 where a current value of m' is received as m_current from block 172 or 164 of FIG. 8 (i.e. from frequency tolerance tester 107 or preprocessing unit 26, respectively). Therefore, m_current refers to the current digit being processed. Also, prior to entering the flow of FIG. 9 (such as in block 154 of FIG. 8), variables used within FIGS. 9 and 10 are initialized. For example, duration, interruption duration, interrupt duration threshold, detect threshold, m_previous, and m_expected may be initialized, such as, for example, to 0 in block 154 of FIG. 8. As used herein, m_current refers to the current digit being processed, m_previous is the previous value of m_current (i.e. the value of m_current during the previous iteration), and m_expected is the value of a possible valid symbol currently being detected (i.e. m_expected is the value of a current symbol candidate that may eventually be validated, depending on the subsequent received values of m_current, as a detected valid symbol). The variables s_min, s_edge, and s_current are used to indicate various positions in the received stream of values for m_current. For example, in one embodiment, the values of m_current may be saved in memory and s_min, s_edge, and s_current may be pointers to these memory locations used for keeping track of certain values of m_current. As used herein, s_current is a pointer to m_current, s_min is a pointer to the first occurrence of the current m_expected value, and s_edge is a pointer to a location corresponding to a previous change in value in the stream of received values of m_current (a location where m_current is not the same as m_previous).

For example, given a stream of values for m_current stored in memory of: 33333333355556, m_current can be 6 (assuming the stream is in the order of oldest value to most recent value of m_current), m_previous is 5, and m_expected can be 3 (assuming that the algorithm earlier provided that enough 3's had been received to indicate the possibility that a valid symbol '3' could be detected). Similarly, s_current indicates the location of m_current, i.e. the 6, s_edge indicates the previous change from 3 to 5, and s_min indicates the first 3. This is only one example of the variable values. The use of these variables will become more apparent in the description of FIGS. 9 and 10.

Therefore, referring back to FIG. 9, duration is calculated in block 202 where duration at this point in the flow corresponds to the duration of m_previous. That is, in the example of the previous paragraph, m_previous is 5, and the duration of m_previous (the duration of the value of 5) is 4 samples (i.e. 1 ms in the current example). Flow then proceeds to decision diamond 204 where it is determined whether m_current is equal to m_previous. If not, then flow proceeds to decision diamond 212 where m_current will continue to be processed. However, if m_current is equal to m_previous flow proceeds to decision diamond 206. Generally, if m_current is equal to m_previous, m_current is not processed and flow proceeds with a next iteration where a new m_current is determined. Therefore, m_current is generally only processed if it is different from m_previous (if it interrupted m_previous).

At decision diamond 206, it is determined whether m_current is 0 (indicating an invalid digit in the current embodiment) and if it is 0, whether its duration (i.e. how many 0's had been received) is greater than an expected minimum pause duration (set, as mentioned above, to 70 samples in the current example). If so, flow proceeds to block 208 where a pause has been detected, thus pause_flag is set to 1. Also, m_expected is initialized to 0, and s_min and s_edge are initialized to point to the same location as s_current. Note that a valid symbol can only be detected upon receiving a valid pause first. Therefore, the pause_flag is set to indicate that now a valid symbol can be detected. After block 208, flow proceeds to block 209. If, at decision diamond 206, either m_current is not 0 or if the duration of 0's is less than or equal to the minimum pause duration, flow proceeds to block 209 where s_current is incremented such that it will point to the new value of m_current to be determined in the next iteration. Flow then proceeds to block 210 where flow returns to decision diamond 176 of FIG. 8. Therefore, s_current is generally continuously incremented until an m_current is received that is different from m_previous.

At decision diamond 204, if m_current is not equal to m_previous (indicating that an "edge" is detected) flow proceeds to decision diamond 212 where processing of m_previous begins. At decision diamond 212, if the duration (calculated in block 202) is less than the detect threshold, flow proceeds to block 222 where the duration (which is the duration of m_previous) is added to the interruption duration (because m_previous, if short enough, can be considered as an insignificant interruption to m_expected). Flow then proceeds to decision diamond 224 where if m_previous is a valid symbol (i.e. not a 0) and the interruption duration is greater than the interrupt duration threshold (which is the maximum allowable interruption), then flow proceeds to block 226 indicating that the duration of m_previous was too long and thus cannot be ignored. Therefore, in block 226, m_expected is reset to 0 (since there is no longer a current m_expected because m_expected was just invalidated due to the too many interruptions resulting in the interruption duration surpassing the interrupt duration thresholds). Also, s_min is reset to the location of "s_current—duration" which corresponds to the starting location of m_previous. Therefore, in the example of 33333333355556 given above, if the interruptions of '5's were too long or caused the total interruption duration to surpass the interrupt duration threshold, s_min would be set to point to the first 5. The 3's preceding the 5 are therefore dropped from consideration. Flow then proceeds to block 228 where s_edge is updated to point to the location of s_current because this now becomes the new previous edge in the stream of received values for m_current, and the duration is recalculated to be "s_edge–s_min" which is the duration of m_previous. Therefore, in this case, m_expected is reset, and the stream of values prior to the reset location of s_min is ignored.

However, if, at decision diamond 224, m_previous is invalid (i.e. 0) or if the interruption duration is not greater than the interrupt duration threshold, then the interruption of m_previous may be neglected and flow proceeds to block 228. In block 228, as described above, s_edge is set to the location of s_current because, as above, this now becomes the new previous edge in the stream of received values for m_current. Duration is also recalculated; however, since the interruption was small enough, the new duration corresponds to the total duration of m_expected. That is, the new duration corresponds to the accumulated duration so far of a current symbol that may possibly be detected as a valid detected symbol. Therefore, in this case, the duration of the negligible m_previous (i.e. considered as a negligible interruption) is simply added on to the duration of the entire m_expected being evaluated. From block 228, flow proceeds to point B of FIG. 10.

Returning back to decision diamond 212, if the duration (of m_previous, calculated in block 202) is greater than or equal to the detect threshold, then m_previous may not simply be an interruption but the start of a new possible symbol to be detected. Therefore, if the duration is greater than or equal to the detect threshold, flow proceeds to decision diamond 214. At decision diamond 214, if m_previous is 0 and the duration is less than the maximum interruption duration, flow goes to block 222 where flow proceeds at block 222 as described above. That is, if m_previous is 0 and the duration is less than the maximum interruption duration, the interruption by a 0 may be considered negligible and is also not considered the possible start of a new symbol. However, if m_previous is a valid symbol (i.e. not 0) or, regardless of the value of m_previous, if the duration exceeds the maximum interruption duration, then flow proceeds to block 216 indicating that m_previous is too long to be an interruption and should be considered as a possible start of a new symbol being entered.

At block 216, the interruption duration is set to 0 and flow proceeds to decision diamond 218. At decision diamond 218, it is determined whether m_previous is equal to m_expected. If it is, then m_previous may have been a continuation of m_expected, and flow proceeds to block 228 where s_edge is reset to the location of s_current, and the duration is reset to the value of "s_edge−s_min" which includes the full duration from s_min, including the duration of m_previous. However, if at decision diamond 218, m_previous is not equal to m_expected, then flow proceeds to block 220 where m_expected is reset to m_previous. In this case, m_previous is no longer considered an interruption of m_expected, but is considered the start of a new possible symbol (i.e. a new m_expected). Also in block 220, s_min is reset to indicate the location of s_edge since this location corresponds to the start of m_previous which now corresponds to the start of a new possible symbol. After block 220, flow proceeds to block 228 where s_edge is reset to s_current, and the duration is recalculated. Note that in this case, the duration is the duration of m_previous (which now corresponds to the duration of a new m_expected) where the stream of values that occurred prior to the new location of s_min are ignored and not included in the new value of duration.

After block 228, flow proceeds to point B of FIG. 10 where the current value of duration corresponds to the full duration of a possible symbol to be detected (with any negligible interruptions). That is, it no longer corresponds to just the duration of m_previous, but instead corresponds to the full duration of the current symbol being detected corresponding to m_expected. Therefore, FIG. 10 begins with decision diamond 230 where it is determined whether m_expected is 0. If so, flow proceeds to decision diamond 232 where if the duration (the total duration of m_expected, with any allowable interruptions) is greater than the expected minimum pause duration, a pause is detected and the pause_flag is set to 1 in block 234. Therefore, anytime a value of 0 is detected (with any allowable interruptions) for a sufficient duration (greater than the minimum pause duration), a pause is detected. (Note that if pause_flag is already set to 1, it remains 1.) If, at decision diamond 232, the duration is not greater than the expected minimum pause duration, flow proceeds to block 244 where m_previous is set to the value of m_current and flow eventually proceeds to decision diamond 176 of FIG. 8 (via point A and block 210 of FIG. 9) where a new sample is received in a next iteration and eventually a new value of m_current is determined.

Referring back to decision diamond 230 of FIG. 10, if m_expected is not 0, then flow proceeds to decision diamond 236 to determine whether m_expected actually becomes a valid detected symbol rather than just a possibly valid symbol. At decision diamond 236 it is therefore determined whether duration (of m_expected, which includes any allowable interruptions) is longer than the expected symbol duration. Note that m_expected can only be considered a valid detected symbol if its duration is greater than a minimum duration, represented in this case by expected symbol duration. For example, in the DTMF standard, a minimum duration corresponds to 40 ms. If the duration is not longer than the expected symbol duration flow proceeds to block 244 where m_previous is set to the value of m_current, and flow returns to decision diamond 176 of FIG. 8 (via point A of and block 210 of FIG. 9) where a next sample is received. However, if the duration is longer than the expected symbol duration, flow proceeds to decision diamond 238 where it is determined whether the pause_flag is set to 1. Even though the duration may be longer than the expected symbol duration, a valid symbol can only be detected if a pause has already been detected. Therefore, if, at decision diamond 238, the pause_flag is set 1 indicating that a pause was previously detected, flow proceeds to block 240 where m_expected is provided at the output of tone detection decision unit 38 (via conductor 50) as the detected symbol. In block 240, the pause_flag is also reset to 0 because another pause must be detected before another valid symbol can be detected. Flow then proceeds to block 242.

However, if at decision diamond 238, the pause_flag was not set to 1, indicating that a pause was not detected prior to m_expected, m_expected is not output as a detected symbol because it is not considered to be a valid symbol. In this case, flow proceeds directly to block 242 from decision diamond 238. In block 242, s_min is reset to the location of s_current in order to indicate the start of a new m_expected, and m_expected is set to the current value of m_current because m_current may be a start of a new m_expected. Flow then proceeds to block 244 where m_previous is set to the value of m_current and flow returns to block 156 of FIG. 8 (via point A and block 210 of FIG. 9) to receive a next sample.

Although the invention has been described with respect a communications system, note that tone detector 14 can be used in any system that requires multicomponent tone detection. Therefore, tone detector 14 can be used within any type of data processing system. Furthermore, tone detector 14 can be implemented in hardware, software, firmware, or any combination thereof. For example, the flow diagrams of FIGS. 8 and 9 can be performed in software or in hardware or in a combination of both.

In the foregoing specification, the invention has been described with reference to specific embodiments. However, one of ordinary skill in the art appreciates that various modifications and changes can be made without departing from the scope of the present invention as set forth in the claims below. For example, any of the methods taught herein may be embodied as software on one or more of computer hard disks, floppy disks, 3.5" disks, computer storage tapes, magnetic drums, static random access memory (SRAM) cells, dynamic random access memory (DRAM) cells, electrically erasable (EEPROM, EPROM, flash) cells, nonvolatile cells, ferroelectric or ferromagnetic memory, compact disks (CDs), laser disks, optical disks, and any like computer readable media. Also, the block diagrams may have different blocks than those illustrated and may have more or less blocks or be arranged differently. Also, the flow diagrams may also be arranged differently, include more or less steps, be arranged differently, or may have steps that can be separated into multiple steps or steps that can be performed simultaneously with one another. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method for performing tone detection, comprising:
   receiving an input signal;
   selecting a first tone format, wherein a first tone corresponds to a first symbol;
   providing a first table of values corresponding to the first tone format, wherein at least one entry in the first table of values relates the first tone to the first symbol;
   using a predetermined algorithm and the first table of values to determined if the input signal comprises the first symbol;
   selecting a second tone format, wherein a second tone corresponds to the first symbol;
   providing a second table of values corresponding to the second tone format, wherein at least one entry in the second table of values relates the second tone to the first symbol; and
   using the same predetermined algorithm and the second table of values to determined if the input signal comprises the first symbol,
   wherein the first tone format and the second tone format are different, and wherein the first table of values and the second table of values have at least one value that is different.

2. A method as in claim 1, wherein the first tone format is dual-tone multiple frequency (DTMF).

3. A method as in claim 1, wherein the first tone format comprises a plurality of components having overlapping frequency bands.

4. A method as in claim 1, wherein the algorithm is non-linear and does not utilize Fourier transform computations.

5. A method as in claim 1, wherein the algorithm extracts a plurality of tone components using a plurality of comb filters.

6. A method for detecting a tone, comprising:
   receiving an input signal;
   filtering the input signal so that a first finite set of selected frequencies are not allowed to pass in order to produce a first tone component;
   filtering the input signal so that a second finite set of selected frequencies are not allowed to pass in order to produce a second tone component; and
   using the first and second tone components to detect the tone, wherein the step of using the first and second tone components to detect the tone comprises:
      estimating a frequency component of the first tone component using a first polynomial function of the first tone component; and
      estimating a frequency component of the second tone component using a first polynomial function of the second tone component.

7. A method as in claim 6, wherein a first comb filter having a first set of coefficients is used to perform the step of filtering the input signal so that a first finite set of selected frequencies are not allowed to pass, and wherein a second comb filter having a second set of coefficients is used to perform the step of filtering the input signal so that a second finite set of selected frequencies are not allowed to pass.

8. A method as in claim 6, wherein the first set of coefficients is adaptive and the second set of coefficients is adaptive.

9. A method as in claim 6, wherein the step of using the first and second tone components to detect the tone further comprises:
   estimating a magnitude component of the first tone component using a second polynomial function of the first tone component; and
   estimating a magnitude component of the second tone component using a second polynomial function of the second tone component.

10. A method as in claim 9, wherein the step of estimating the magnitude component of the first tone component comprises:
    using a moving average to extract a magnitude of the first tone component.

11. A method as in claim 6, wherein the step of estimating the frequency component of the first tone component comprises:
    performing low-pass filtering using adaptive coefficients in order to reduce noise.

12. A method as in claim 6, wherein the step of using the first and second tone components to detect the tone comprises:
    deciding after each sample of the input signal whether the tone has been detected, wherein samples of the input signal need not be stored.

13. A method as in claim 6, further comprising:
    estimating power of the input signal using a polynomial function of the tone; and
    if the power of the input signal is below a predetermined threshold, performing no further processing on the input signal until the power of the input signal is no longer below the predetermined threshold.

14. A method as in claim 6, further comprising:
    adjusting gain of the input signal.

15. A method as in claim 6, wherein the input signal is dual-tone multiple frequency (DTMF) signal.

16. A method as in claim 6, wherein an amount of time required to estimate a frequency component of the first tone component is independent of a frequency of the first tone component.

17. A method as in claim 6, wherein the step of using the first and second tone components to detect the tone comprises:
    using a first table for a first tone format; and
    using a second table for a second tone format.

18. A method as in claim 6, further comprising:
    determining if the detected tone corresponds to a valid symbol of a tone format corresponding to the detected tone.

* * * * *